US008228006B2

(12) United States Patent
Komatsu et al.

(10) Patent No.: US 8,228,006 B2
(45) Date of Patent: Jul. 24, 2012

(54) HIGH PRESSURE DISCHARGE LAMP LIGHTING DEVICE AND LIGHTING FIXTURE USING THE SAME

(75) Inventors: Naoki Komatsu, Kobe (JP); Hiroyasu Eriguchi, Neyagawa (JP); Takeshi Goriki, Yawata (JP); Takeshi Kamoi, Kyoto (JP); Jun Kumagai, Suita (JP); Akira Yufuku, Himeji (JP); Nobutoshi Matsuzaki, Neyagawa (JP); Satoru Nagata, Kobe (JP); Daisuke Yamahara, Shijonawate (JP)

(73) Assignee: Panasonic Corporation, Osaka (JP)

( * ) Notice: Subject to any disclaimer, the term of this patent is extended or adjusted under 35 U.S.C. 154(b) by 168 days.

(21) Appl. No.: 12/864,905

(22) PCT Filed: Jan. 28, 2009

(86) PCT No.: PCT/JP2009/051352
§ 371 (c)(1),
(2), (4) Date: Jul. 28, 2010

(87) PCT Pub. No.: WO2009/096424
PCT Pub. Date: Aug. 6, 2009

(65) Prior Publication Data
US 2010/0327775 A1    Dec. 30, 2010

(30) Foreign Application Priority Data
Jan. 28, 2008    (JP) .................................. 2008-015775

(51) Int. Cl.
*H01J 11/04*    (2011.01)
*H01J 13/48*    (2006.01)
*H01J 15/04*    (2006.01)
*H01J 17/36*    (2006.01)

(52) U.S. Cl. .... 315/326; 315/291; 315/349; 315/DIG. 7
(58) Field of Classification Search ........................ None
See application file for complete search history.

(56) References Cited

U.S. PATENT DOCUMENTS
5,384,518 A    1/1995    Kido et al.
(Continued)

FOREIGN PATENT DOCUMENTS
EP    1 916 882 A1    4/2008
(Continued)

OTHER PUBLICATIONS
Supplementary European Search Report for the Application No. EP 09 70 5035 dated Dec. 7, 2011.
(Continued)

*Primary Examiner* — Anh Tran
(74) *Attorney, Agent, or Firm* — Cheng Law Group, PLLC

(57) ABSTRACT

A high pressure discharge lamp lighting device comprising an inverter, an igniter, a controller, a pulse voltage detection circuit, and the starting pulse voltage regulation circuit. The inverter applies a lighting voltage to a high pressure discharge lamp. The controller applies the starting pulse voltage generated by the igniter to the high pressure discharge lamp. The pulse voltage detection circuit is configured to detect a voltage indicative of the starting pulse voltage to output a detection signal. The starting pulse voltage regulation circuit is configured to regulate the starting pulse voltage to a desired value of the starting pulse voltage on the basis of the detection signal. The pulse voltage detection circuit is configured to detect either one of the voltage developed in the specified circuit component of the igniter and the starting pulse voltage as the voltage indicative of the voltage indicative of the starting pulse voltage.

9 Claims, 25 Drawing Sheets

U.S. PATENT DOCUMENTS

| | | | |
|---|---|---|---|
| 6,104,147 | A | 8/2000 | Nakamura et al. |
| 7,462,992 | B2 * | 12/2008 | Arbinger et al. ............... 315/289 |
| 2005/0035727 | A1 | 2/2005 | Muramatsu et al. |
| 2008/0203937 | A1 * | 8/2008 | Hooijer et al. ................. 315/276 |

FOREIGN PATENT DOCUMENTS

| | | |
|---|---|---|
| JP | 5-121189 A | 5/1993 |
| JP | 6-303767 A | 10/1994 |
| JP | 11-135279 A | 5/1999 |
| JP | 2002-75673 A | 3/2002 |
| JP | 2007-52977 A | 3/2007 |
| JP | 2007-257841 A | 10/2007 |

OTHER PUBLICATIONS

International Search Report for the Application No. PCT/JP2009/051352 mailed Apr. 28, 2009.

Notification of Reasons for Refusal for the Application No. 2008-015775 from Japan Patent Office mailed May 15, 2012.

* cited by examiner high pressure pulse voltage output voltage from the inverter voltage applied to the high pressure discharge lamp high pressure pulse voltage output voltage from the step down chopper output voltage from the inverter voltage applied to the high pressure discharge lamp high pressure pulse voltage output of the control circuit at the starting of the step down chopper output of the control circuit at the starting of the step up chopper output voltage from the step up chopper output voltage from the step down chopper output voltage from the inverter voltage applied to the high pressure discharge lamp FIG. 19a
output voltage
from the step
down chopper
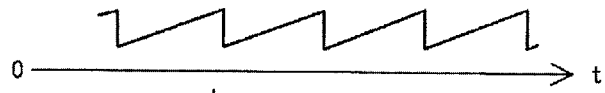

FIG. 19b
high pressure
pulse voltage
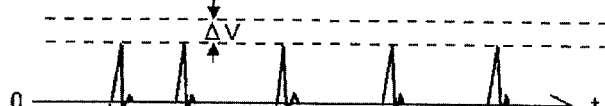

FIG. 19c
output from the
pulse voltage
detection circuit
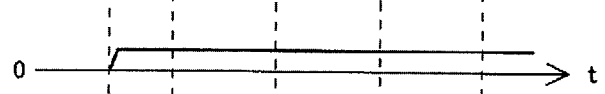

FIG. 19d
output from the detection
circuit of the
step down chopper
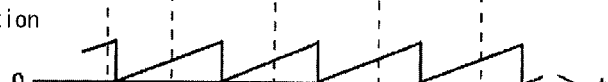

FIG. 19e
output of the
starting pulse voltage
generation circuit
controlling circuit
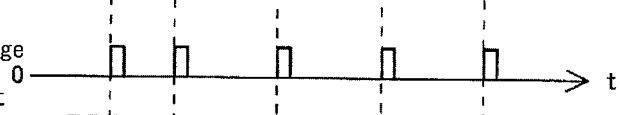

FIG. 19f
output voltage
from the step
down chopper

FIG. 20
output
voltage
from the
inverter
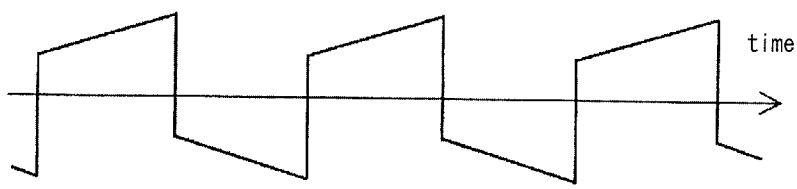

FIG. 21
output
voltage
from the
inverter
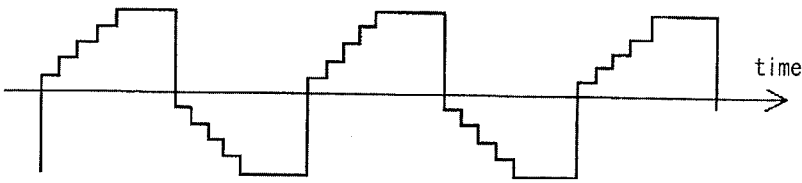

FIG. 22a
signal for inverting the output of the inverter
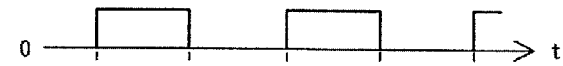

FIG. 22b
output of the starting pulse voltage generation circuit controlling circuit
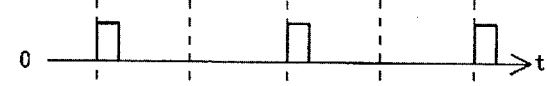

FIG. 22c
output voltage from the step down chopper

FIG. 22d
output voltage from the inverter

FIG. 22e
voltage applied to the high pressure discharge lamp

FIG. 23a
signal for inverting the output of the inverter

FIG. 23b
output of the starting pulse voltage generation circuit controlling circuit

FIG. 23c
high pressure pulse voltage
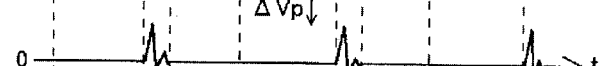

FIG. 23d
output voltage from the step down chopper
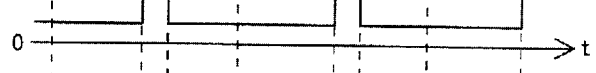

FIG. 23e
voltage applied to the high pressure discharge lamp

HIGH PRESSURE DISCHARGE LAMP LIGHTING DEVICE AND LIGHTING FIXTURE USING THE SAME

TECHNICAL FIELD

This invention relates to a high pressure discharge lamp lighting device being configured to regulate a peak value of the starting pulse voltage for turning on a high pressure discharge lamp. In addition, this invention relates to a lighting fixture using the high pressure discharging lamp lighting device.

BACKGROUND ART

Japanese patent application publication No. 2007-52977A discloses a prior high pressure discharge lamp lighting device. The prior high pressure discharge lamp lighting device is configured to receive a direct current power or an alternating current power from a power source disposed in an outside of the high pressure discharge lamp lighting device. The prior high pressure discharge lamp lighting device comprises a power conversion circuit, an inverter, and an igniter. The power conversion circuit is configured to convert the alternating current power or the direct current power into a direct current voltage having a predetermined voltage value. The inverter is configured convert the direct current voltage output from the power conversion circuit into the lighting voltage which is rectangular wave and also which is alternate current. The inverter is configured to apply the lighting voltage to the high pressure discharge lamp via output terminals. The prior igniter comprises a switching element, a capacitor, an inductor, and a transformer. The switching element is controlled by the controller to be turned on or to be turned off. The capacitor is configured to be charged by the direct current voltage which is output from the boost chopper circuit. The inductor is disposed to prevent the electrical current larger than the predetermined value from flowing to the switching element. The transformer is configured to generate the starting pulse voltage by the discharge current which is flown when the capacitor discharges. The high pressure discharge lamp lighting device further comprises a feedback winding. The feedback winding is wound around a core of the transformer because the feedback winding detects the voltage indicative of the starting pulse voltage. The voltage detected by the feedback winding is output to the starting pulse detection circuit through the voltage dividing circuit. The starting pulse detection circuit feeds back the detection result of the voltage to the controller. The controller is configured to control the switching element in order to adjust the starting pulse voltage to have a predetermined voltage value.

DISCLOSURE OF THE INVENTION

Problems to be Resolved by the Invention

However, the above high pressure discharge lamp lighting device requires the feedback winding N3 in order to detect the voltage indicative of the starting pulse voltage. The feedback winding is wound around the core of the transformer. Therefore, the feedback winding is required to have a high electrical insulation property. Therefore, it is necessary to give the high electrical insulation property to the feedback winding.

This invention is achieved to solve the above problem. An object in this invention is to provide the high pressure discharge lamp lighting device being configured to vary the starting pulse voltage to the predetermined value by detecting the starting pulse voltage without using the feedback winding.

Means of Solving the Problem

The high pressure discharge lamp lighting device in this invention an inverter, an igniter, a controller, a pulse voltage detection circuit, and a starting pulse voltage regulation circuit. The inverter is configured to apply a lighting voltage to the high pressure discharge lamp through the output terminals. The igniter comprises a capacitor, a switching element, and a transformer. The capacitor is configured to be charged by a voltage source. The transformer comprises a primary winding and a secondary winding. The primary winding is connected across the capacitor. The primary winding is connected in series with the switching element. The secondary winding is connected between the output terminals of the inverter. The secondary winding is connected in series with the high pressure discharge lamp. The controller is configured to control the switching element in order to switch on or switch off the switching element. The controller is configured to control the switching element to switch on in order to allow the capacitor to discharge for flowing a discharge current to the primary winding. Consequently, the controller is configured to apply the starting pulse voltage to the high pressure discharge lamp. The starting pulse voltage is generated in the secondary winding. The starting pulse voltage is generated by the discharge current which flows through the primary winding. The pulse voltage detection circuit is configured to detect a voltage indicative of the starting pulse voltage applied to the high pressure discharge lamp in order to output the detection signal. The starting pulse voltage regulation circuit is configured to regulate the starting pulse voltage to a predetermined value on the basis of the detection signal. The pulse voltage detection circuit is configured to detect the pulse voltage generated across the circuit element of the igniter, or the starting pulse voltage as the voltage indicative of the starting pulse voltage.

In this case, it is possible to obtain the high pressure discharge lamp lighting device being configured to detect the voltage indicative of the pulse voltage generated across the circuit element of the igniter or the starting pulse voltage as the voltage indicative of the starting pulse voltage.

It is preferred that the pulse voltage detection circuit is connected across the high pressure discharge lamp lighting device, whereby the pulse voltage detection circuit is configured to detect the starting pulse voltage in order to output the detection signal.

In this case, it is possible to obtain the high pressure discharge lamp lighting device being configured to detect the voltage value of the starting pulse voltage applied to the high pressure discharge lamp as the voltage value of the voltage indicative of the starting pulse voltage.

It is preferred that the pulse voltage detection circuit is connected in parallel with the primary winding. The pulse voltage detection circuit is configured to detect the pulse voltage generated across the primary winding in order to output the detection signal.

In this case, it is possible to obtain the high pressure discharge lamp lighting device being configured to detect the pulse voltage generated in the primary winding as the voltage value of the voltage indicative of the starting pulse voltage.

It is preferred that the igniter further comprises an impedance. The impedance is connected in series with the primary winding. The pulse voltage detection circuit is configured to detect a pulse voltage generated in the impedance in order to output the detection signal.

In this case, it is possible to obtain the high pressure discharge lamp lighting device being configured to detect the pulse voltage generated in the impedance as the voltage value of the voltage indicative of the starting pulse voltage.

It is preferred that the pulse voltage detection circuit is configured to detect a peak value of the voltage indicative of the starting pulse voltage in order to generate the detection signal.

It is preferred that the pulse voltage detection circuit is configured to detect a period from when the voltage indicative of the starting pulse voltage becomes equal to a first voltage value to when the voltage indicative of the starting voltage becomes equal to the first voltage value. The pulse voltage detection circuit is configured to generate the detection signal corresponding to the period.

It is preferred that the pulse voltage detection circuit is configured to detect a period from when the voltage indicative of the starting voltage becomes equal to a first voltage value to when the voltage indicative of the starting voltage becomes equal to a second voltage value. The pulse voltage detection circuit is configured to generate the detection signal corresponding to the period.

It is preferred that the switching element is configured to be switched on when the switching element receives an operating voltage. The switching element has an internal impedance corresponding to a voltage value of the operating voltage. The pulse voltage detection circuit is configured to generate the detection signal indicative of a voltage level corresponding to a voltage value of the voltage indicative of the starting pulse voltage. The starting pulse voltage regulation circuit is configured to vary the operation voltage according to the detection signal.

In this case, it is possible to regulate the discharge current which flows through the primary winding. Therefore, it is possible to regulate the starting pulse voltage applied to the high pressure discharge lamp.

In addition, it is preferred for the high pressure discharge lamp lighting device to employ the high pressure discharge lamp lighting device of the above.

BRIEF EXPLANATION OF THE DRAWINGS

FIG. 19a to FIG. 19f shows an operation waveform of the seventh embodiment.
FIG. 20 shows a waveform indicative of the variation of the output of the inverter of the seventh embodiment in a case where the inverter is connected to no load.
FIG. 21 shows another waveform indicative of the variation of the output of the inverter of the seventh embodiment in a case where the inverter is connected to no load.
FIG. 22a to FIG. 22e show operation waveforms of the eighth embodiment.
FIG. 23a to FIG. 23e show operation waveforms of the ninth embodiment.

BEST MODE FOR CARRYING OUT THE INVENTION (First Embodiment)

Figure 1:
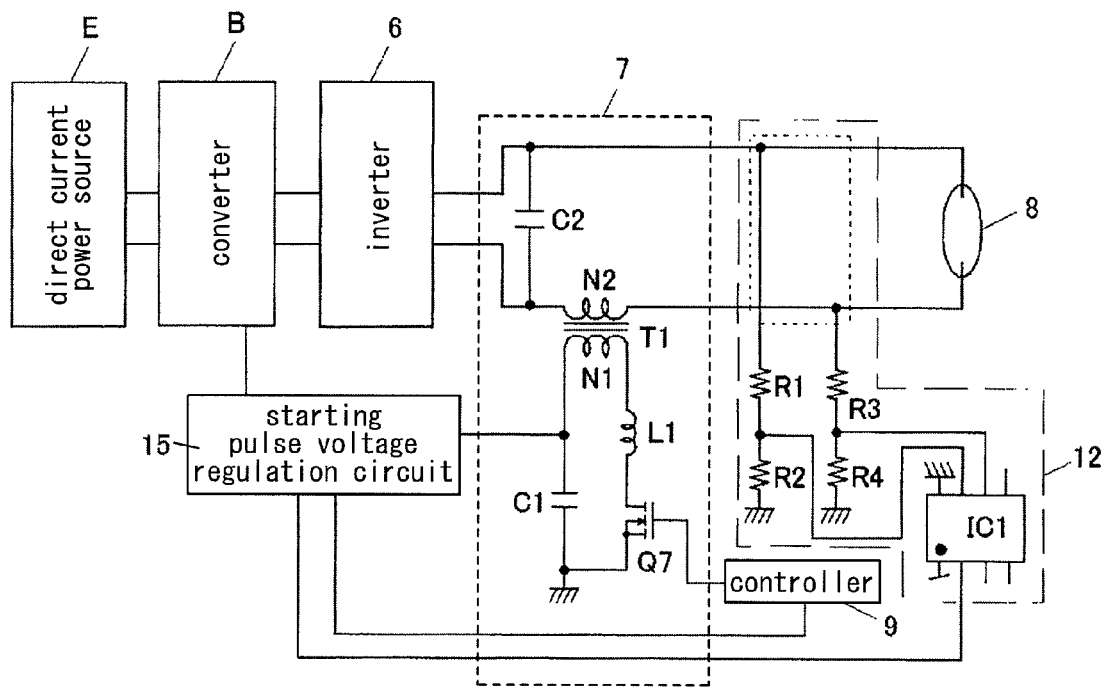
FIG. 1 shows a circuit diagram of the first embodiment.

FIG. 1 shows a circuit diagram indicating all components in the first embodiment. Hereinafter, the components of the circuit in the first embodiment are explained. The high pressure discharge lamp lighting device in this embodiment comprises a power converter B, the inverter 6, an igniter 7, a controller 9, and a starting pulse voltage regulation circuit 15. The high voltage discharge lamp lighting device is configured to receive the electrical power from the direct current power source E. The direct current power source E is realized by, for example, a commercial power source and a rectifying circuit. The rectifying circuit is configured to rectify the alternating voltage supplied by the commercial power source. The converter B comprises a step up chopper and a step down chopper. The converter B is configured to adjust the voltage rectified by the rectifying circuit to a direct current voltage having a predetermined voltage value. The converter B is configured to step up or step down the voltage value of the predetermined direct current voltage so as to convert the voltage value of the voltage value into the predetermined voltage value. The inverter 6 is configured to convert the direct current voltage which is output from the converter B into the rectangular alternating voltage. The rectangular alternating voltage having a predetermined voltage value is so called a lighting voltage. The inverter 6 is configured to apply the lighting voltage through the output terminals. The igniter 7 is configured to generate the starting pulse voltage when the high pressure discharge lamp 8 is started, and apply the starting pulse voltage to the high pressure discharge lamp 8. The starting pulse voltage regulation circuit 15 is configured to regulate the starting pulse voltage applied to the high pressure discharge lamp 8 to a predetermined value.

The igniter 7 comprises a capacitor C1, a transformer T1, an impedance L1, and a switching element Q7. The capacitor C1 is configured to receive the voltage from the converter B which acts as the voltage source, thereby being charged. The impedance L1 is provided for preventing an excess current from flowing to the switching element Q7. The transformer T1 comprises a primary winding N1 and a secondary winding N2. The primary winding N1 is connected across the capacitor C1. The primary winding N1 is connected in series with the switching element Q7 and the impedance L1. Therefore, the primary winding N1 is cooperative with the impedance L1 and the switching element Q7 to form the discharge circuit. The discharge circuit is configured to flow the discharge current from the capacitor C1 when the capacitor C1 is discharged. The secondary winding N2 is connected across the inverter 6. The secondary winding N2 is connected in series with the high pressure discharge lamp. The switching element Q7 is controlled by the controller 9, whereby the switching element Q7 is turned on or is turned off by the controller 9. The controller 9 is configured to turn on the switching element Q7 to discharge the capacitor C1. When the capacitor C1 is discharged, the discharge current is flown to the discharge circuit. When the discharge current flows to the primary winding N1, the discharge current flowing to the primary winding causes secondary winding N2 to develop the starting pulse voltage. In addition, when the discharge current is flown to the primary winding N1, the pulse voltage is developed across the primary winding N1. In addition, when the discharge current is flown to the inductor L1, the pulse voltage is developed across the inductor L1.

Figure 2:
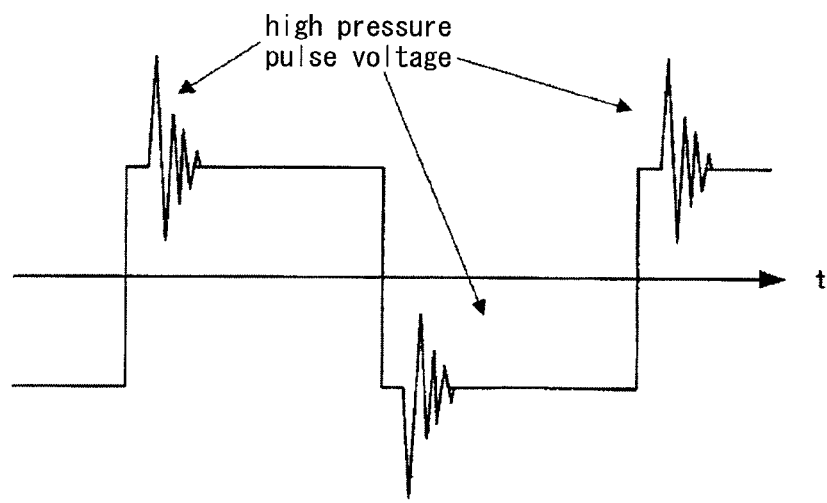
FIG. 2 shows an operation waveform of the first embodiment.

FIG. 2 shows a waveform of the voltage applied to the high pressure discharge lamp 8 when the high pressure discharge lamp 8 is started. As shown in FIG. 2, when the high pressure discharge lamp 8 is started, the voltage including the lighting voltage and starting pulse voltage which is superimposed on the lighting voltage is applied to the high pressure discharge lamp 8 when the high pressure discharge lamp 8 is started.

In the first embodiment, the high pressure discharge lamp lighting device further comprises a voltage dividing circuit and a microcomputer. The voltage dividing circuit is provided for detecting the starting pulse voltage applied to the high pressure discharge lamp 8. The voltage dividing circuit is configured to output the first voltage value and the second voltage value. The first voltage value is obtained by dividing the starting pulse voltage applied to the high pressure discharge lamp 8 at a resistor R1 and a resistor R2. The second voltage value is obtained by dividing the starting pulse voltage applied to the high pressure discharge lamp 8 at a resistor R3 and the resistor R4. The starting pulse voltage divided by the voltage dividing circuit is output to the microcomputer IC1. The microcomputer IC1 is configured to detect the starting pulse voltage generated across the high pressure discharge lamp 8 on the basis of the difference between the first voltage and the second voltage. The starting pulse voltage is, so called, the voltage indicative of the starting pulse voltage. Subsequently, the microcomputer IC1 generates the detection signal. The starting pulse voltage regulation circuit 15 is configured to regulate the voltage of the capacitor C1 on the basis of the detection signal. In addition, the starting pulse voltage regulation circuit 15 is configured to regulate timing for allowing the controller 9 to turn on the switching element Q7 on the basis of the detection signal. In this manner, the starting pulse voltage regulation circuit 1 is configured to regulate the voltage value of the starting pulse voltage to a predetermined voltage value.

With this configuration, it is possible to obtain the pulse voltage detection circuit being configured to detect the starting pulse voltage without using the feedback winding. Consequently, there is no need for the high pressure discharge lamp lighting device to employ the transformer T1 having a large size. In addition, it is possible to detect the starting pulse voltage accurately.

Figure 3:
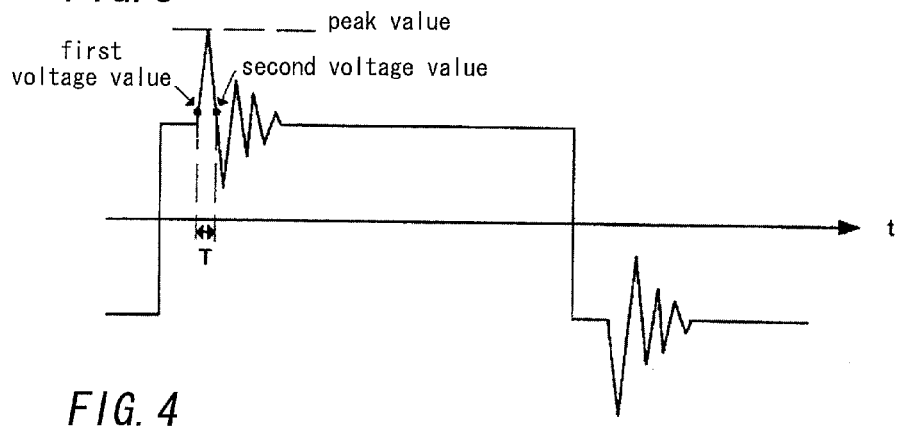
FIG. 3 shows an operation waveform of the first embodiment.
Figure 4:
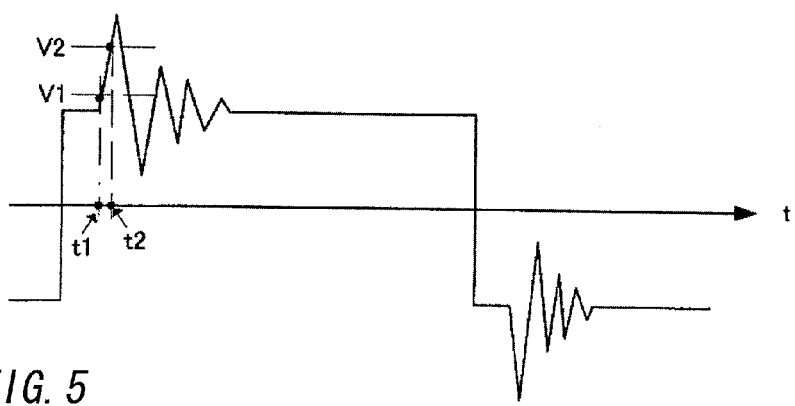
FIG. 4 shows an explanation diagram of the first embodiment.

When the microcomputer IC1 is used for detecting the starting pulse voltage, it is preferred to employ the pulse voltage detection circuit with the configurations hereinafter mentioned. First, it is preferred that the pulse voltage detection circuit 12 is configured to detect the peak value of the voltage indicative of the starting pulse voltage in order to output the output signal. That is, as shown in FIG. 3, the pulse voltage detection circuit is configured to detect the peak value of the starting pulse voltage which is superimposed on the lighting voltage. Second, it is preferred that the pulse voltage detection circuit 12 is configured to detect the period from a first time when the voltage indicative of the starting pulse voltage reaches the first voltage value to a second time when the voltage indicative of the starting pulse voltage reaches the first voltage value next to the first time, and outputs the detection signal. Third, it is preferred that the pulse voltage detection circuit is configured to detect the difference between the voltage V1 at the first time of the starting pulse voltage and the voltage V2 at the second time of the starting pulse voltage. It is possible to obtain the same effect by employing the above first, the second, and the third.

It should be noted that the inverter 6 is realized by the full bridge inverter and also the half bridge inverter.

Figure 5:
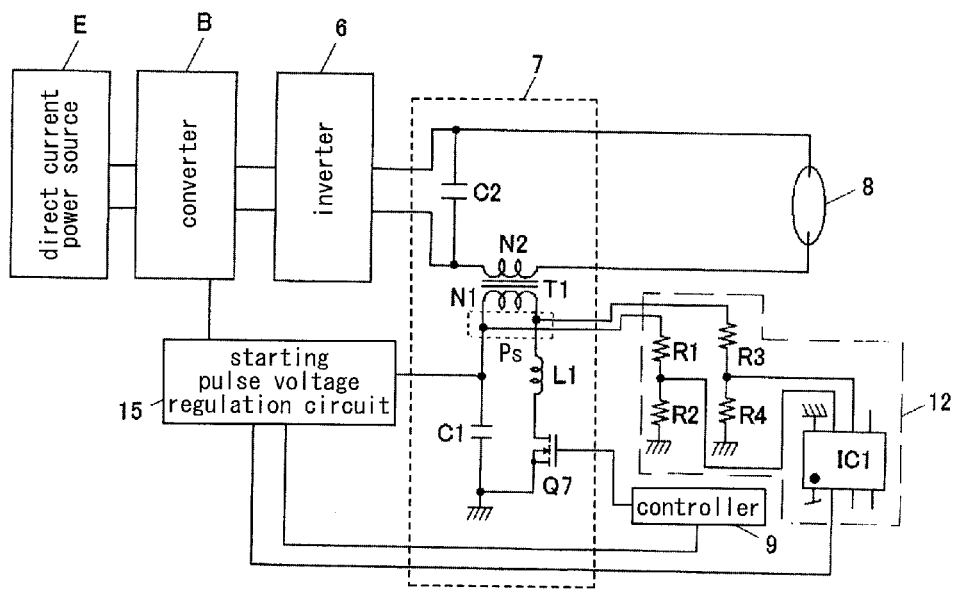
FIG. 5 shows a circuit diagram of a first modification of the first embodiment.

FIG. 5 shows a first modification of the first embodiment of the high pressure discharge lamp lighting device. In this modification, the pulse voltage detection circuit 12 is connected in parallel with the primary winding N1. Consequently, the pulse voltage detection circuit 12 is configured to detect the pulse voltage developed in the primary winding N1.

The pulse voltage developed in the primary winding N1 has a correlative relationship with respect to the starting pulse voltage developed in the secondary winding N2. The correlative relationship is determined by a turn ratio between the primary winding and the secondary winding. Therefore, in this modification, the pulse voltage regulation circuit is configured to detect the starting pulse voltage indirectly from the pulse voltage developed across the primary winding N1 and the turn ratio of the primary winding and the secondary winding. Therefore, the pulse voltage developed across the primary winding N1 is, so called, the voltage indicative of the starting pulse voltage.

Therefore, in this modification, the voltage across the primary winding N1 is divided by the voltage dividing circuit R1 to R4 to output the divided voltage. The divided voltage is input into the microcomputer IC1. IC1 is configured to obtain the difference between the voltage divided by the resistors R1, R2, and the voltage divided by the resistors R3, R4. Consequently, it is possible to detect the high pressure pulse voltage developed across the high pressure discharge lamp 8 for starting the high pressure discharge lamp 8. With this configuration, the voltage applied to the resistors R1 to R4 for detecting the voltage is reduced than that of in the first embodiment. Therefore, it is possible to downsize the pulse voltage detection circuit 12.

Figure 6:
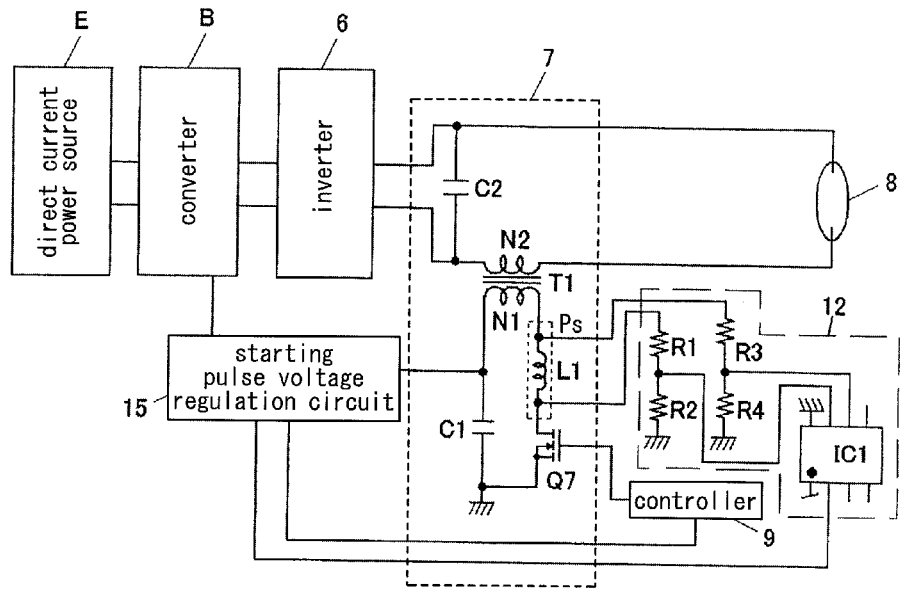
FIG. 6 shows a circuit diagram of a second modification of the first embodiment.

FIG. 6 shows a second modification of the first embodiment. In this modification, the pulse voltage detection circuit 12 is connected in parallel with the impedance L1. The impedance L1 is realized by the coil. When the capacitor C1 is discharged, the pulse voltage is developed in the impedance L1. The pulse voltage developed in the impedance L1 has a correlative relationship with respect to the starting pulse voltage developed in the secondary winding N2. The correlative relationship is determined by the turn ratio between the impedance L1 and the secondary winding N2. Therefore, in this modification, the pulse voltage regulation circuit is configured to detect the starting pulse voltage indirectly from the pulse voltage developed across the impedance L1 and the turn ratio between the impedance L1 and the secondary winding N2. That is, the pulse voltage developed in the impedance L1 corresponds to the voltage indicative of the starting pulse voltage.

In this modification, starting pulse voltage is indirectly detected from the pulse voltage developed across the inductor L1 as the detection result. The starting pulse voltage regulation circuit 15 is configured to receive the detection result to regulate the voltage of the capacitor C1. Or, the controller 9 is configured to receive the detection result in order to control the timing of turning on the switch. In this manner, the starting pulse voltage is kept within a predetermined range.

Figure 7:
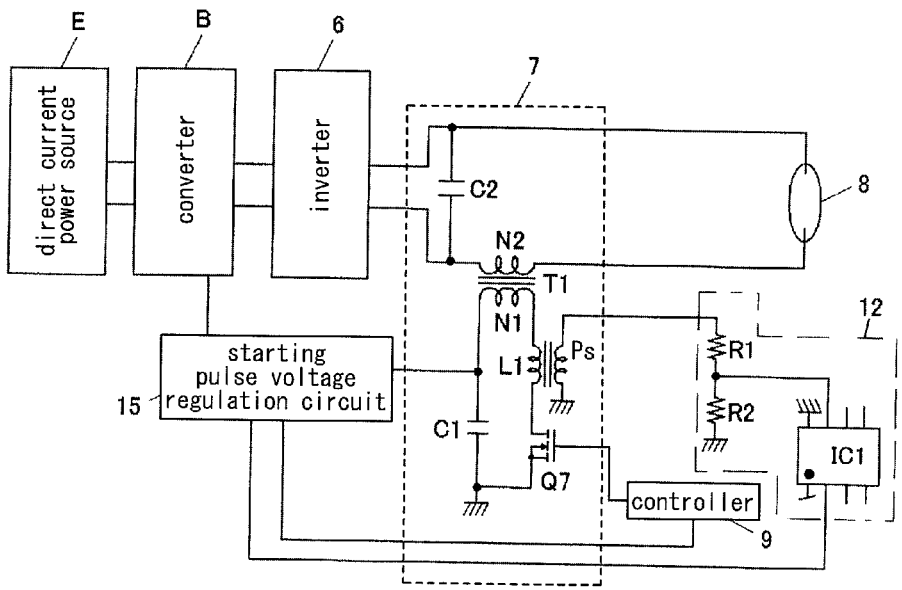
FIG. 7 shows a circuit diagram of the modifications of the first embodiment.

Furthermore, as shown in FIG. 7, it is possible to employ the transformer instead of the impedance L1. In this case, the voltage indicative of the starting pulse voltage is detected through the transformer.

(Second Embodiment)

Figure 8:
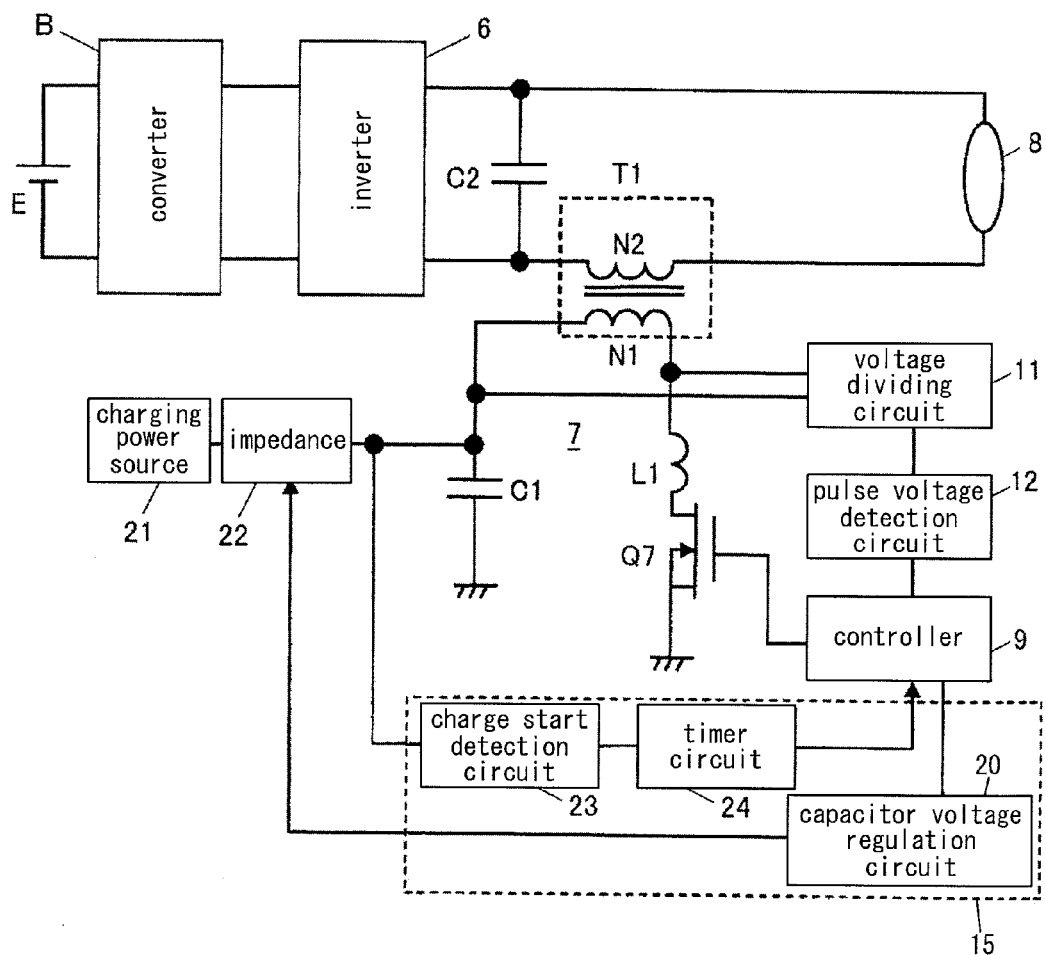
FIG. 8 shows a circuit diagram of a second embodiment.

FIG. 8 shows a circuit diagram of the high pressure discharge lamp lighting device in the second embodiment. The components in common with the components in the first embodiment are referred by the same reference numerals. Therefore, the explanations of the components in common with the components in the first embodiment are omitted.

The high pressure discharge lamp lighting device in the second embodiment comprises the converter B, the inverter 6, the controller 9, the igniter 7, the voltage dividing circuit 11, the pulse voltage detection circuit 12, the starting voltage regulation circuit 15, a charging power source 21, and an impedance 22.

The starting voltage regulation circuit 15 comprises a capacitor voltage regulation circuit 20, a charge start detection circuit 23, and a timer circuit 24. The impedance 22 is configured to have a variable impedance value. The variable impedance 22 is connected in series with the capacitor C1. The variable impedance 22 is connected between the charging power source 21 and the capacitor C1. The variable impedance 22 is cooperative with the capacitor C1 to form the charging circuit for the capacitor C1. The capacitor voltage regulation circuit 20 is configured to vary the impedance value of the variable impedance 22. The charge start detection circuit 22 is configured to detect the start of the charging of the capacitor C1 when the charging power source 21 starts applying the voltage to the capacitor C1. The charge start detection circuit 22 is configured to output a charge start detection signal when the charge start detection circuit 22 detects the start of the charging. The timer circuit 24 is configured to measure the lapse of the predetermined time from when the timer circuit 24 receives the charge start detection signal. When the timer circuit 24 measures the lapse of the predetermined time, the timer circuit 24 outputs the on-signal to the controller 9. When the controller receives the on-signal, the controller 9 is configured to turn on the switching element Q7. In addition, the capacitor voltage regulation circuit 20 is configured to regulate the impedance value of the variable impedance 22 on the basis of the detection signal.

In this embodiment, the pulse voltage detection circuit 12 is configured to detect the pulse voltage developed in the primary winding N1 through the voltage dividing circuit 11. When the pulse voltage detection circuit 12 detects the pulse voltage which is greater than a predetermined voltage value, the capacitor voltage regulation circuit 20 outputs the detection signal in order to increase the impedance value of the impedance 22. In contrast, when the pulse voltage detection circuit 12 detects the pulse voltage which is smaller than a certain voltage value, the capacitor voltage regulation circuit 20 outputs the detection signal to reduce the impedance value of the impedance 22. With this configuration, it is possible to keep the starting pulse voltage developed in the secondary winding within a predetermined range.

Furthermore, when the high pressure discharge lamp 8 is started, the tube voltage is substantially reduced while the large tube current flows. Therefore, it is possible to detect the lighting of the high pressure discharge lamp 8 by detecting the decrease of the output voltage of the converter B. Similarly, it is possible to detect the lighting of the high pressure discharge lamp 8 by detecting the increase of the output current of the converter B. When the lighting of the high pressure discharge is detected, the charge of the capacitor C1 or the turn-on operation of the switching element Q7 is prohibited, whereby the development of the starting pulse is stopped.

Figure 9:
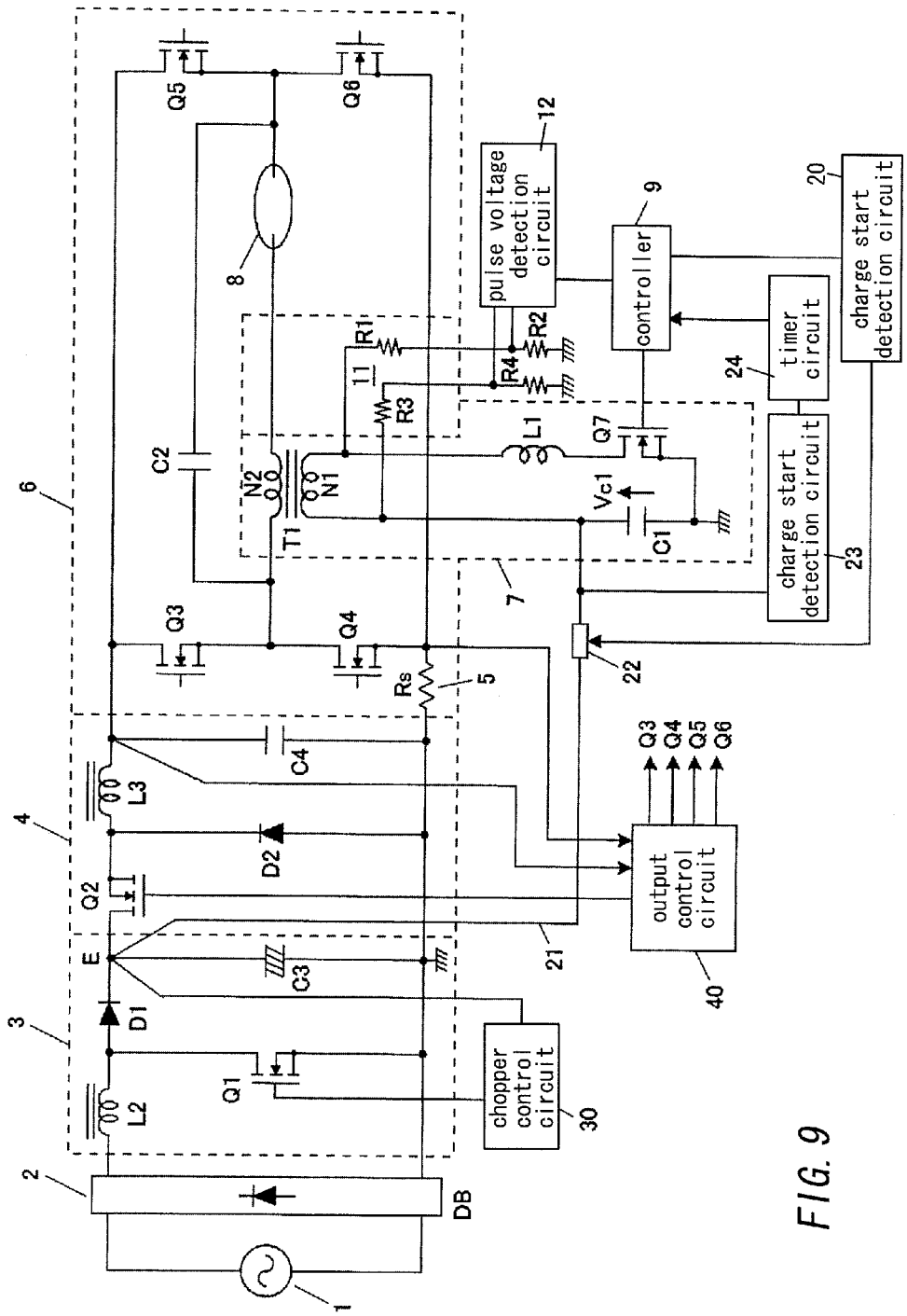
FIG. 9 shows a circuit diagram of the second embodiment.

FIG. 9 shows a circuit diagram of the high pressure discharge lamp lighting device specifically. As shown in FIG. 8, the high pressure discharge lamp lighting device in this embodiment comprises the rectification circuit 2, the step up chopper 3, the step down chopper 4, the inverter 6, the igniter 7, the pulse voltage detection circuit 12, the controller 9, the capacitor voltage regulation circuit 20, the charge start detection circuit 23, and the timer circuit 24. The rectification circuit 2 comprises a diode bridge DB. The rectification circuit 2 is configured to full-wave rectifies the commercial alternating current voltage in order to produce a pulsating voltage. The inductor L2 is connected in series with the switching element Q1 to construct a series circuit. The series circuit is connected across the diode bridge DB. The step up chopper 3 comprises an inductor L2, a switching element Q1, a diode D1, and a smoothing capacitor C3. The smoothing capacitor C3 is connected across the switching element Q1 through the diode D1. The switching element Q1 is controlled by the chopper control circuit 30 to be turned on or to be turned off by the chopper control circuit 30. The chopper control circuit 30 is easily realized by the integrated circuit in the marketplace. The switching element Q1 is turned on and turned off at a frequency sufficiently higher than a frequency of the commercial alternating current voltage which is output from the commercial alternating current power source 1. Consequently, the output voltage of the diode bridge DB is raised to a specified direct current voltage. The smoothing capacitor C3 is charged by a specified direct current voltage.

The direct current power source E in this embodiment comprises a smoothing capacitor C3 which is configured to rectify and to smooth the output of the commercial alternating current power source 1, whereby the direct current power source E supplies the direct current voltage. In other words, the direct current power source E in this embodiment is an output voltage which is output from the step up chopper 3 which is connected to the output terminal of the diode bridge DB. However, the direct current power source E is not limited thereto.

The step down chopper 4 acts as the ballast for supplying the target electrical power to the high pressure discharge lamp 8 which defined as the load. In addition, the step down chopper 4 is controlled to output a variable output voltage in such a manner that the step down chopper 4 supplies the suitable electrical power to the high pressure discharge lamp 8 during the period from the starting, through the arc discharging, to the suitable lighting.

The step down chopper 4 comprises a switching element Q2, an inductor L3, a diode D2, and a capacitor C4. The smoothing capacitor C3 has a positive terminal which is connected to a positive terminal of the capacitor C4 through the switching element Q2 and the inductor L3. The capacitor C4 also has a negative terminal which is connected to a negative terminal of the smoothing capacitor C3. The negative terminal of the capacitor C4 is connected to an anode of the diode D2 in order to flow a regenerative current. A cathode of the diode D2 is connected to a connection point between the switching element Q2 and the inductor L3.

The switching element Q2 is controlled by the control signal which is output from the output control circuit 40 in such a manner that the switching element Q2 is turned on and turned off at a high frequency. When the switching element Q2 has on state, the direct current power source E supplies the electrical current which flows through the switching element Q2, the inductor L3, and the capacitor C4. When the switching element Q2 has off state, the regenerative current flows through the inductor L3, the capacitor C4, and the diode D2. Therefore, the direct current voltage which is output from the direct current voltage source E is stepped down to produce the stepped down direct current voltage. The capacitor C4 is charged by the stepped down direct current voltage. The output control circuit is configured to vary a duty cycle. (The duty cycle is a ratio between the on-state-period to the one period.) Consequently, the output control circuit 40 is configured to vary the voltage applied to the capacitor C4.

The step down chopper 4 is provided at its output terminal with the inverter 6. The inverter 6 is realized by the full bridge circuit which comprises the switching elements Q3 to Q6. The switching element Q3 is paired with the switching element Q6 as a first pair. The switching element Q4 is paired with the switching element Q5 as a second pair. The first pair and the second pair are alternately turned on at a low frequency by the control signal which is output from the output control circuit 40. Consequently, the inverter 6 converts the output power which is output from the step down chopper 4 into the rectangular alternating current voltage. The inverter 6 supplies the rectangular alternating current voltage to the high pressure discharge lamp 8. The high pressure discharge lamp 8 is realized by a high brightness high pressure discharge lamp such as a metal halide lamp, a high pressure mercury lamp.

(Third Embodiment)

Figure 10:
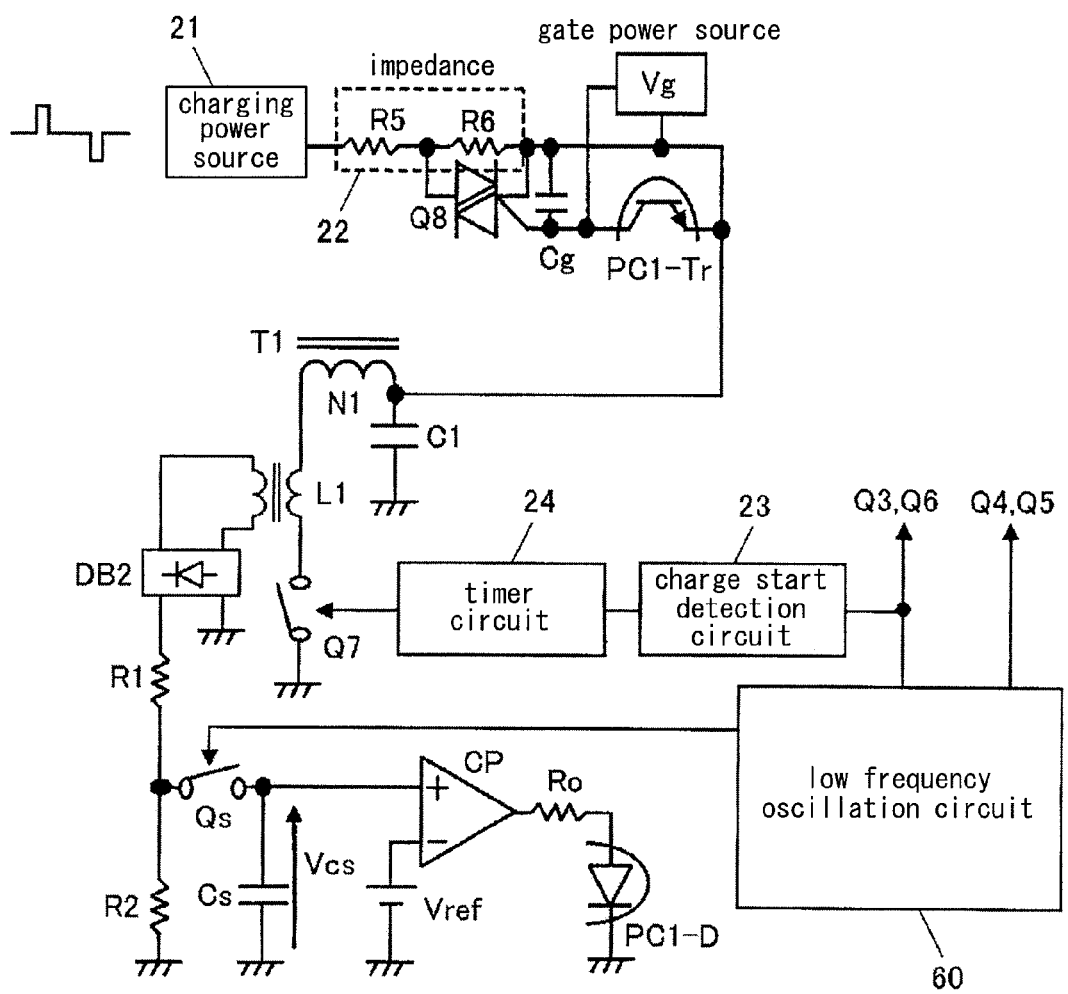
FIG. 10 shows main components of the circuit diagram of the third embodiment.

FIG. 10 shows main components of the third embodiment. The main components has circuit components same as the components shown in FIG. 8. It should be noted that the components in common with that of in the above embodiments is referred by the same reference numerals, whereby the explanation of the components in common with that of the above embodiments is omitted. As shown in FIG. 8, the charging power source 21 realized by the direct current power source E which is unipolar. The charging power source 21 is configured to charge the capacitor C1 in one direction. In contrast, FIG. 10 shows a power source which is configured to invert the polarity in synchronization with the inverter 6. The power source in FIG. 10 is configured to charge the capacitor C1 in the positive direction and in the negative direction alternately. The charging power source 21 in this embodiment is configured to start charging the capacitor C1 immediately after the polar of the output from the inverter 6 is inverted. After the switching element Q7 is turned on, the power source is configured to stop charging the capacitor C1 until the polarity is inverted next time. In addition, the capacitor C1 is alternately charged in the positive direction and in the negative direction with every inversion of the polar of the output from the inverter 6. Therefore, the switching element Q7 is realized by a bidirectional switching circuit being configured to flow the current in the position direction and also in the negative direction. The bidirectional switching circuit is, specifically, a switching circuit which comprises two MOSFET in common with the source terminal, and which is in series with each other while the MOSFET has a reversed terminal.

Although FIG. 10 omits the secondary winding N2 of the transformer T1, the secondary winding N2 is connected to the high pressure discharge lamp 8 and also the capacitor C2 located in an output side of the inverter 6 such that the secondary winding N2 is cooperative with the capacitor C2 and the high pressure discharge lamp 8 to form a closed series circuit.

The pulse voltage induced in the inductor L1 of the primary winding circuit, in this embodiment, has a polarity which is inverted according to the charging polarity of the capacitor C1. Therefore, the voltage dividing circuit is connected to the primary winding L1 through the rectifier DB2. Consequently, the pulse voltage detection circuit is configured to detect the peak value of the pulse voltage of the positive voltage, an also to detect the peak value of the pulse voltage of the negative voltage.

The switching element Qs is provided for sampling-and-holding. The switching element Qs is configured to be turned on by a low frequency oscillation circuit in synchronization with the timing of the development of the pulse voltage. Consequently, the switching element Qs allows the capacitor Cs to hold the detection voltage Vcs corresponding to the voltage of resistor R2 for sample-and-hold. The detection voltage Vcs in the capacitor Cs is compared with a reference voltage Vref by the comparator CP. When the Vcs and Vref satisfy the relationship of "Vcs>Vref", the comparator outputs "high signal". In contrast, when the Vcs and Vref satisfy the relationship of "Vcs≦Vref", the comparator outputs "low signal". When the comparator CP outputs the "high signal", a light emitting diode PC1-D of a photo coupler PC1 outputs an optical signal through the resistor Ro, whereby a photo transistor PC1-Tr is turned on. As a result, the both ends of the gate capacitor Cg of the triac Q8 is closed, whereby the triac Q8 is turned off. In this manner, the impedance 22 becomes in series with the resistor R5 and the resistor R6. As a result, a charging speed of the capacitor C1 from the charging power source 21 becomes slow. In contrast, when the photo transistor PC1-Tr of the photo coupler PC1 has off state, the gate power source Vg charges the gate capacitor Cg. Consequently, the triac Q8 is turned on. When the triac Q8 is turned on, the both ends of the resistor R6 is closed, whereby the impedance 22 is equivalent to the resistor R5. As a result, the charging speed of the capacitor C1 from the charging power source 21 becomes fast.

As mentioned above, immediately after the output of the inverter is inverted, the charging power source 21 starts charging the capacitor C1. When the charge start detection circuit 23 detects the start of charging of capacitor C1, the timer circuit 24 starts measuring the time passage. When the timer circuit 24 finishes measuring a constant time, the switching element Q7 outputs the on signal. In this embodiment, the charge start detection circuit 23 is configured to detect the inversion of the polarity of the output from the inverter 6, whereby the charge start detection circuit 23 detects the timing of the start of the charging of the capacitor C1.

FIG. 9 shows the inverter 6 which is realized by the full bridge circuit comprising the switching elements Q3 to Q6. The low frequency oscillation circuit 60 is configured to turn on or turn off the second pair comprising the switching elements Q4 and Q5 at the same moment. The low frequency oscillation circuit 60 is configured to turn on or turn off the first pair comprising the switching element Q3 and Q6 at the same moment. The low frequency oscillation circuit 60 is configured to control the switching element Q4 and the switching element Q3 in such a manner that the switching element Q4 is turned on when the switching element Q3 is turned off. The low frequency oscillation circuit 60 is configured to control the switching element Q4 and the switching element Q3 in such a manner that the switching element Q4 is switched off when the switching element Q3 is switched on. Furthermore, the charge start detection circuit 23 in this embodiment is configured to detect the operation signal of the switching elements Q3 and Q6. In addition, the charge start detection circuit 23 is configured to detect the timing of the variation of the operation signal from "high signal" to "low signal". Or, the charge start detection circuit 23 is configured to detect the timing of the variation of the operation signal from "low signal" to "high signal". The charge start detection circuit 23 is configured to detect the timing of the above variations as the timing of starting charging the capacitor C1. The charge start detection circuit 23 is configured to output the charge start detection signal when the charge start detection circuit 23 detects the timing of starting charging the capacitor C1. When the timer circuit 24 receives the charge start detection signal, the timer circuit 24 is configured to measure the time passage which is suitable for charging the capacitor C1 in such a manner that the capacitor C1 holds the voltage for developing the starting pulse. After elapse of a predetermined time, the timer circuit 24 is configured to output the on signal to the controller 9. When the controller 9 receives the on signal, the controller controls the switching element Q7 to turn on. The circuit comprising the capacitor C1 is provided with a variable impedance 22. Therefore, even if the capacitor C1 is charged at a certain period, the charging voltage for charging the capacitor C1 is varied according to the impedance value of the variable impedance 22.

Figure 11:
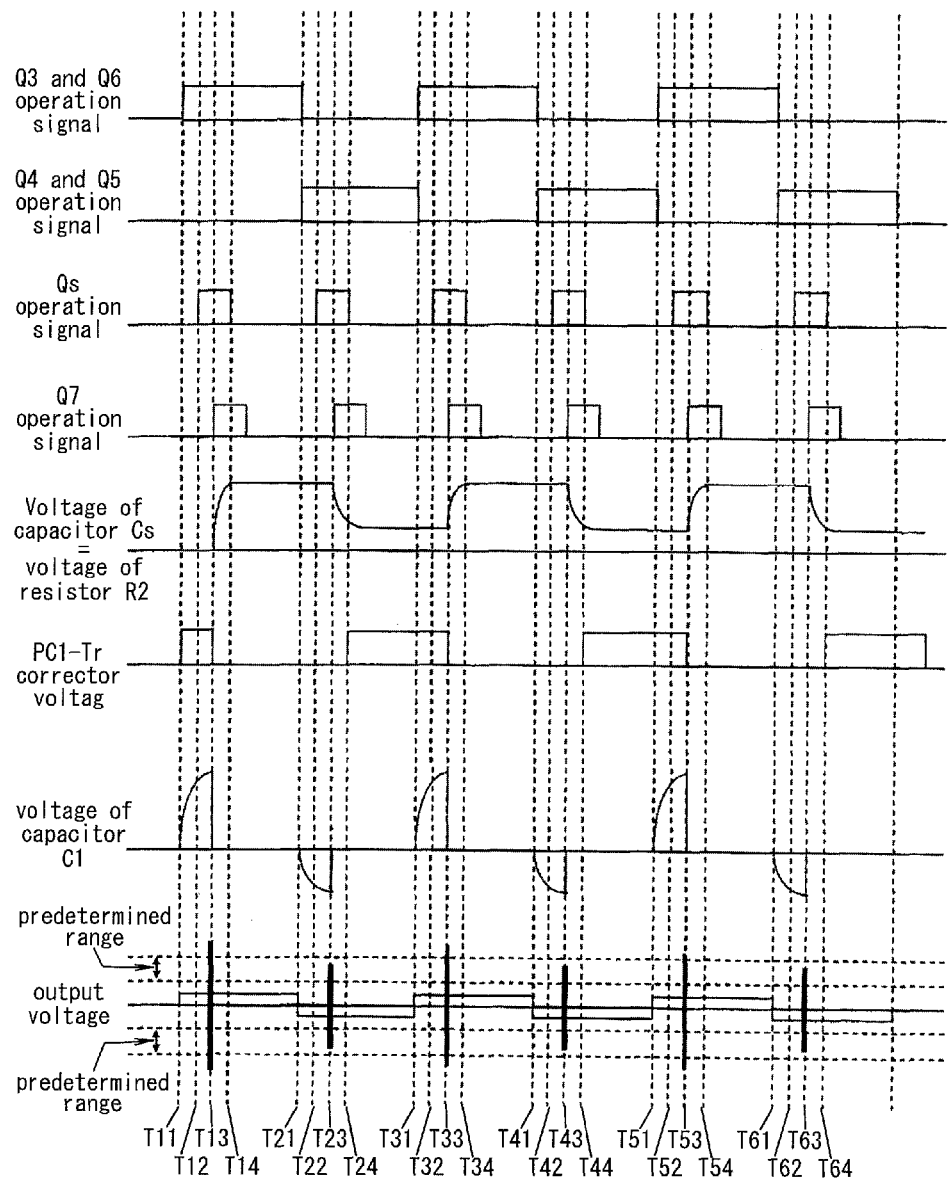
FIG. 11 shows a waveform indicating the operation of a third embodiment.

FIG. 11 shows a waveform of the output signal and the output voltage which are output from the high pressure discharge lamp lighting device in this embodiment. "Q3, Q6 operation signal" shows the on signal for the switching elements Q3 and 06 of the inverter 6. "Q4, Q5 operation signal" shows the on signal of the switching elements QQ4 and Q5. "Qs operation signal" shows the on signal of the switching element Qs which is provided for sampling-and-holding. The low frequency oscillation circuit 60 is configured to output the on signal in such a manner that the low frequency oscillation circuit 60 turns on the switching element Qs in synchronization with the generation of the pulse voltage. Q7 operation signal shows an on signal for the switching element Q7. The timer circuit 24 is configured to output the Q7 operation signal after an elapse of the predetermined period from the timing of the inversion. Furthermore, in the circuit of FIG. 9, the low frequency oscillation circuit 60 generates the Qs operation signal. However, it is possible to employ the timer circuit 24 being configured to generate the Qs operation signal. It is preferred that the Qs operation signal becomes on state immediately before when the Q7 operation signal becomes on state. In addition, it is also preferred that the Qs operation signal becomes off state after the peak value of the pulse voltage is detected.

In FIG. 11, a "Cs voltage" shows the voltage of the capacitor Cs for sampling and holding. The Cs voltage is equivalent to the voltage which is sampled and held by the resistor R2 when the switching element Qs is turned on. PC1-Tr collector voltage is equivalent to the voltage which is held by the gate capacitor Cg of the triac Q8 for varying the impedance. C1 voltage shows the voltage of the capacitor C1. The output voltage shows the voltage applied to the high pressure discharge lamp 8 without load.

Hereinafter, the operation in this embodiment is explained with the waveform in FIG. 11.

It should be noted that the charging power source 21 in FIG. 10 is connected to the series circuit comprising the capacitor C1 through the switch circuit which is disposed between "the connection point of the switching element Q3 and Q4" and "the connection point between the switching element Q5 and the switching element Q6". In this case, the switch circuit is configured to be closed over a period from when the polarity is inverted to when the timing of the pulse is generated. However, the configuration of the charging power source 21 is not limited thereto.

First, when the switching elements Q3 and Q6 are turned on, and the switching elements Q4 and Q5 are turned off, the charging power source 21 flows the charging current to the capacitor C1 through the impedance 22. As a result, the voltage of the capacitor C1 is increased. When the charge start detection circuit 23 detects the timing of the inversion, the charge start detection circuit outputs the charge start detection signal. When the predetermined period is passed after the timer circuit 24 receives the charging start detection signal, the controller 9 turns on the switching element Q7. In this manner, the capacitor C1 discharges. The discharge current which is flown from the capacitor C1 flows to the primary winding N1 of the transformer T1. Consequently, an operation pulse voltage is induced in the primary winding N1. When the operation pulse voltage is induced in the primary winding N1, the starting pulse voltage is induced in the secondary winding N2. The starting pulse voltage is applied across the high pressure discharge lamp 8. In addition, when the switching elements Q3, Q6 is turned off and also when the switching element Q4, Q5 is turned on, the charging power source 21 flows the charging current in the reverse direction, and applies the charging current to the capacitor C1 through the impedance 22. Consequently, the voltage of the capacitor C1 is increased negatively. When the charge start detection circuit 23 detects the timing of the inversion of the polarity, the charge start detection circuit outputs the charge start detection signal. The timer circuit 24 receives the charge start detection signal, and subsequently output the on signal after the elapse of the predetermined period. When the timer circuit 24 outputs the on signal, the controller 9 turns on the switching element Q7. Consequently, similar to the above, the starting pulse voltage is applied to the high pressure discharge lamp 8.

The starting pulse voltage has a correlative relationship with respect to the operation pulse voltage. In addition, the operation pulse voltage also has a correlative relationship with respect to an amount of electrical charge which is charged by the capacitor C1. Therefore, it is possible to vary the starting pulse voltage by varying the amount of the electrical charge which is charged by the capacitor C1 at a moment when the switching element Q1 is turned on. When the capacitor C1 is discharged, the inductive voltage is developed in the inductor L1. The pulse voltage detection circuit detects the inductive voltage as the operation pulse voltage. Therefore, the pulse voltage detection circuit detects the operation pulse voltage on the basis of the voltage indicative of the operation pulse voltage developed across the inductor L1. When the operation pulse voltage is higher than the predetermined value, it is possible to lower the peak value of the starting pulse voltage by decreasing the amount of the electrical charge in the capacitor C1 at the moment when the switching element Q1 is turned on. In contrast, when the operation pulse voltage is lower than the predetermined value, it is possible to increase the peak value of the starting pulse voltage by increasing the voltage of the capacitor C1 at the moment when the switching element Q1 is turned on.

In time T11, the plus terminal of the comparator CP has 0V. The minus terminal of the comparator CP has Vref V. Therefore, the comparator CP outputs the output voltage which is kept at Low. Consequently, the light emitting diode PC1-D connected to a primary side of the photo coupler PC1 has off state. According to the off state of the photo coupler PC1, the photo transistor PC1-Tr which is connected to the secondary side of the photo coupler PC1 also has off state. In addition, the triac Q8 is maintained to have on state in order to prevent the gate capacitor Cg (which is charged by the gate voltage source Vg of the triac Q8) from being discharged. In this case, the electrical current flows from the charging power source 21 through the resistor R5 of the impedance 22 to the capacitor C1. Consequently, the capacitor C1 is charged. Subsequently, in time T13, the switching element Q7 is turned on. When the switching element Q7 is turned on, the charge which is charged by the capacitor C1 is discharged, whereby the electrical current flows to the primary winding N1 through the switching element Q7. The operation pulse voltage LN1×di/dt is determined in terms of "a gradient di/dt" and "the inductance value LN1 of the primary winding N1". The operation pulse voltage LN1×di/dt generated in the primary winding N1 induces the starting pulse voltage in the secondary winding N2. The starting pulse voltage is applied to the high pressure discharge lamp 8.

When the capacitor C1 discharges, the capacitor C1 flows the discharge current to the discharging circuit. The discharge current induces the voltage indicative of the operation pulse voltage in the inductor L1. The voltage indicative of the operation pulse voltage is detected by the rectifier DB2, the resistor R1, and the resistor R2. Subsequently, the low frequency oscillation circuit turns on the switching element Qs at time T12. Consequently, the voltage applied to the resistor R2 is applied to the capacitor Cs. In time T14, the voltage of the capacitor Cs is held when the switching element Qs is turned off. When the voltage Vcs of the capacitor Cs is higher than the reference voltage Vref, "the output of the comparator CP becomes High", "the light emitting diode PC1-D connected to the primary side of the photo coupler PC1 becomes ON", "the photo transistor PC1-Tr connected to the secondary side of the photo coupler PC2 becomes ON", and "the triac Q8 becomes OFF", whereby the capacitor C1 is charged by the series resistance composed of the resistor R5 and the resistor R6. As a result, the time constant of the charge is increased. As a result, the charging voltage (for charging the capacitor C1) at the moment when the switching element Q7 is turned on is decreased. Therefore, when the switching element Q7 is turned on in time T23, the peak value of the starting pulse voltage developed in the secondary winding N2 is decreased than the peak value of the starting pulse voltage which is developed in the time T13.

In contrast, when the voltage Vcs of the capacitor Cs is lower than the reference voltage Vref in time T24, "the output of the comparator becomes Low", "the light emitting diode PC1-D connected to the primary side of the photo coupler PC1 becomes OFF", "the photo transistor PC1-Tr connected to the secondary side of the photo coupler PC2 becomes OFF", "the triac Q8 becomes ON", whereby the capacitor C1 is charged by a voltage which is applied to only the resistor R5. As a result, the time constant of the charge is increased. As a result, the charging voltage (for charging the capacitor Q1) at the moment when the switching element Q7 is switched on is increased. In this manner, the starting pulse voltage is regulated within the predetermined range by varying the impedance 22 of the charging path for the capacitor C1.

(Fourth Embodiment)

Figure 14:
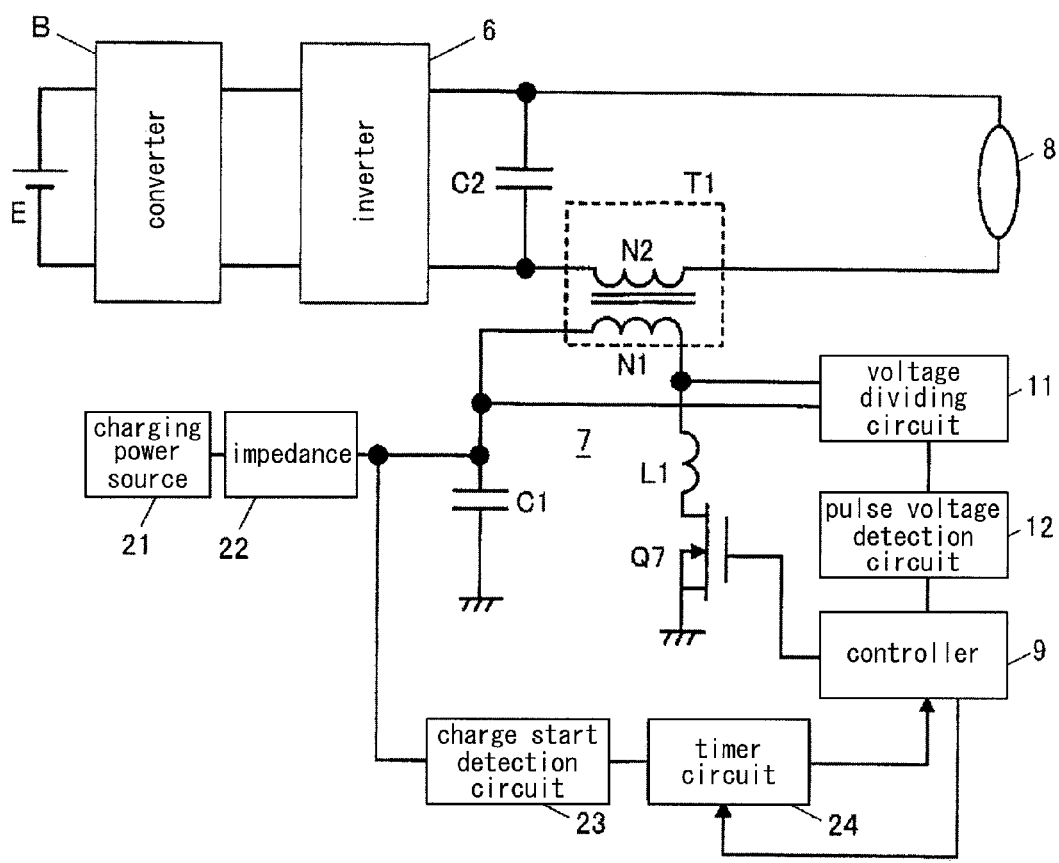
FIG. 14 shows a circuit diagram of the fifth embodiment.

FIG. 14 shows the circuit diagram of the main components of the high pressure discharge lamp lighting device. It should be noted that the main components shown in FIG. 7 are also able to employ to the main components in this embodiment. Furthermore, the components in common with the above embodiment are referred by the same reference numeral, whereby the explanations are omitted. In this embodiment, the time constant for charging the capacitor C1 is maintained as a steady value. In addition, the timer circuit 24 is configured to vary the timing of turning on the switching element Q7. Consequently, the capacitor voltage regulation circuit is configured to vary the starting pulse voltage. With this configuration, the starting pulse voltage regulation circuit is configured to regulate the peak value of the starting pulse voltage.

The charging power source 21 is, similar to the above, configured to charge the capacitor by the power source. The power source has a positive polarity and also a negative polarity. The power source is configured to reverse its polarity alternately in synchronization with the inversion of the inverter 6. Consequently, the charging power source 21 is configured to charge the capacitor C1 in the positive direction and also in the negative direction alternately. The charging power source 21 is configured to start charging the capacitor C1 immediately after the polarity of the output of the inverter 6 is reversed. The charging power source 21 is configured to stop charging the capacitor until next inversion of the polar after when the switching element Q7 is turned on.

In this embodiment, the impedance 22 comprises a resistor R5 which is not able to vary its resistance value. That is, the charging circuit has a time constant which is steady value. When the charging power source 21 starts charging the capacitor C1 through the impedance 22, the electrical charge which is charged by the capacitor C1 is increased on the basis of the time constant of the charging circuit.

As mentioned above, the starting pulse voltage is correlative with the voltage which is held by the capacitor C1. Therefore, it is possible to vary the peak value of the starting pulse voltage by varying the amount of the electrical charge of the capacitor C1 at the moment when the switching element Q7 is turned on. That is, the pulse voltage detection circuit is configured to detect the starting pulse voltage on the basis of the inductive voltage (which corresponds to the voltage indicative of the starting pulse voltage) developed in the inductor L1 of the charging circuit. There is a situation where the inductive voltage is higher than a predetermined value. Under this situation, the controller 9 outputs the signal to the switching element Q7 in order to turn on the switching element Q7 when capacitor C1 holds a low amount of the electrical charge. Consequently, the controller 9 reduces the starting pulse voltage. In contrast, there is a situation where the inductive voltage is lower than the predetermined value. Under this situation, the controller 9 outputs the signal to the switching element Q7 in order to turn on the switching element Q7 when the capacitor C1 holds a large amount of the electrical charge. Consequently, the controller 9 increases the starting pulse voltage.

Hereinafter, the specific configuration is explained. The operation for detecting the peak value of the starting pulse voltage from the detection value of the inductive voltage in the inductor L1 as the voltage Vcs of the capacitor Cs is similar to the above. In the fourth embodiment, an operational amplifier OP is employed instead of the comparator CP. The operational amplifier OP is cooperative with the transistor Qt to construct a buffer circuit. Because an amplification factor (amplification gain) of the operational amplifier OP is extremely high, the plus terminal holds the voltage which is equal to the minus terminal. In other words, the amplification factor of the operational amplifier OP is extremely high, the plus terminal and the minus terminal are closed virtually. The output voltage of the operational amplifier OP is obtained as a sum of the voltage Vcs of the capacitor Cs and the voltage VBE between a base and an emitter of the transistor Qt. That is, the operational amplifier Op is cooperative with the transistor Qt to act as the butter amp having the amplification factor equal to 1 for applying the voltage Vcs (which is the sample-and-hold for the capacitor Cs) to the resistor Rt4. Consequently, the current which is resulted by the voltage Vc divided by the resistor Rt4 flows to the resistor Rt4. The current which is resulted by the voltage Vc divided by the resistor Rt4 also flows to the resistor Rt3 as a collector current for the transistor Qt. The resistor Rt3 is in series with the transistor Qt and the resistor Rt4 to form the series circuit. The series circuit is connected in parallel with the resistor Rt2. The series circuit is cooperative with the timer circuit 23 to determine the time constant for charging of the capacitor Ct.

Figure 13:
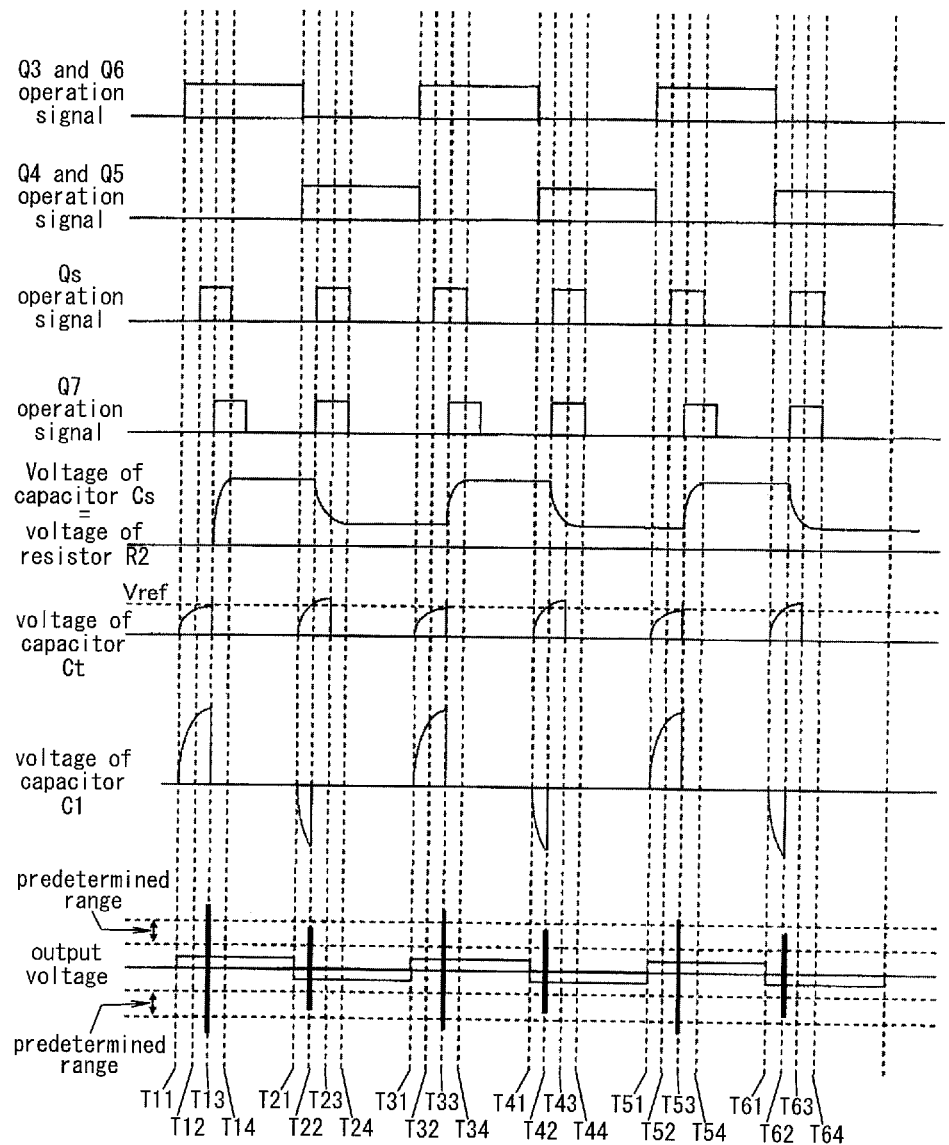
FIG. 13 shows an operation waveform of the fourth embodiment.

FIG. 13 shows the waveform of the output signal which is output from the high pressure discharge lamp lighting device, and also the output voltage which is output from the high pressure discharge lamp lighting device. The switching element Q7 is configured to be turned on when the voltage reaches the reference voltage Vref, whereby the capacitor C1 is discharged. Therefore, in this embodiment, it is possible to vary the voltage of the capacitor Cs by varying the timing of turning on of the switching element.

The timer circuit 23 is realized by the commodity-type IC for timer. The timer circuit 23 is configured to apply "the current equal to the current which flows through the resistor Rt1 from an internal power source" to the capacitor Ct. Or, the timer circuit 23 is configured to apply "the current which has a proportional relationship to the current which flows through the resistor Rt1 from the internal power source" to the capacitor Ct. When the starting pulse voltage is increased, the inductive voltage of the inductor L1 is also increased, whereby the voltage Vcs of the capacitor Cs is increased. The operational amplifier OP is configured to operate such that the voltage of the plus terminal is equal to the voltage of the minus terminal. Therefore, when the voltage Vcs of the capacitor Cs is increased, the voltage applied to the resistor Rt4 is also increased. As a result, the current which flows to the resistor Rt3, the transistor Qt, and the resistor Rt4 are increased. Consequently, the current which flows to the capacitor Ct is increased. As the current which flows to the capacitor Ct is increased, the period until the voltage of the capacitor Ct reaches the voltage Vref is shortened. Therefore, the switching element Q7 is turned on at a moment when the capacitor C1 has low voltage. In this manner, when the starting pulse voltage is increased, the circuit operates to reduce the starting pulse voltage. In contrast, when the starting pulse voltage is decreased, the voltage applied to the resistor Rt4 is also lowered. As the voltage applied to the resistor Rt4 is lowered, the charging current of the capacitor Ct is decreased. As a result, the timing of turning on the switching element Q7 is delayed. Consequently, the circuit operates to increase the starting pulse voltage. With this configuration, the starting pulse voltage is regulated within a predetermined range.

Figure 12:
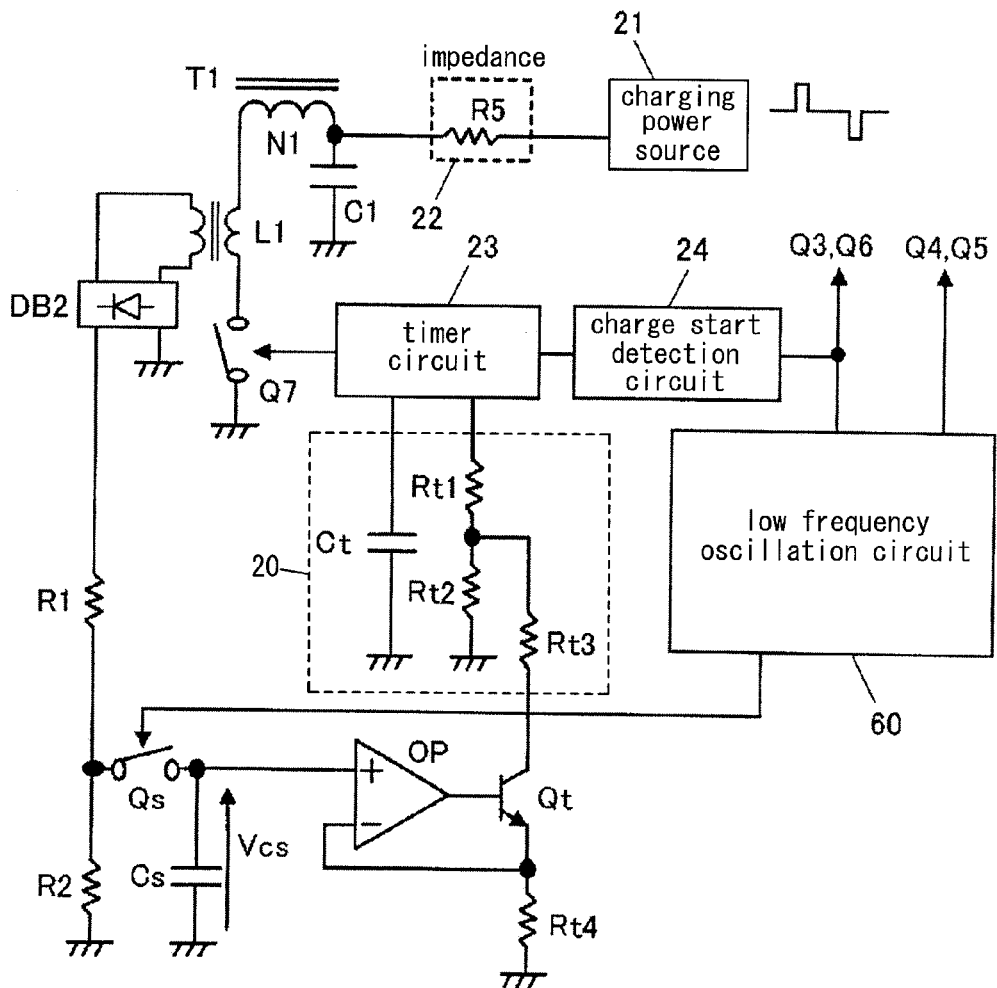
FIG. 12 shows main components of the circuit diagram of the fourth embodiment.

It should be noted that, in the circuit of FIG. 12, the low frequency oscillation circuit 60 produces "the Qs operation signal". However, it is possible to vary the timing of the pulse generation. Therefore, it is possible to employ the timer circuit being configured to produce "the Qs operation signal". It is preferred that the Qs operation signal becomes on-indication immediately before the Q7 operation signal becomes on indication, and that the Qs operation signal becomes off-indication after the peak value of the pulse voltage is detected.

(Fifth Embodiment)

FIG. 14 shows the circuit diagram in the fifth embodiment. The circuit configurations in this embodiment are approximately in common with the configurations in FIG. 8. However, this embodiment employs the control of the timer circuit which is controlled to vary the period of the timing instead of the control of the impedance 22 which is controlled to be varied. In addition, in this embodiment, the pulse voltage detection circuit 12, the controller 9, the charge start detection circuit 23, and the timer circuit 24 are realized by the microcomputer.

Figure 15:
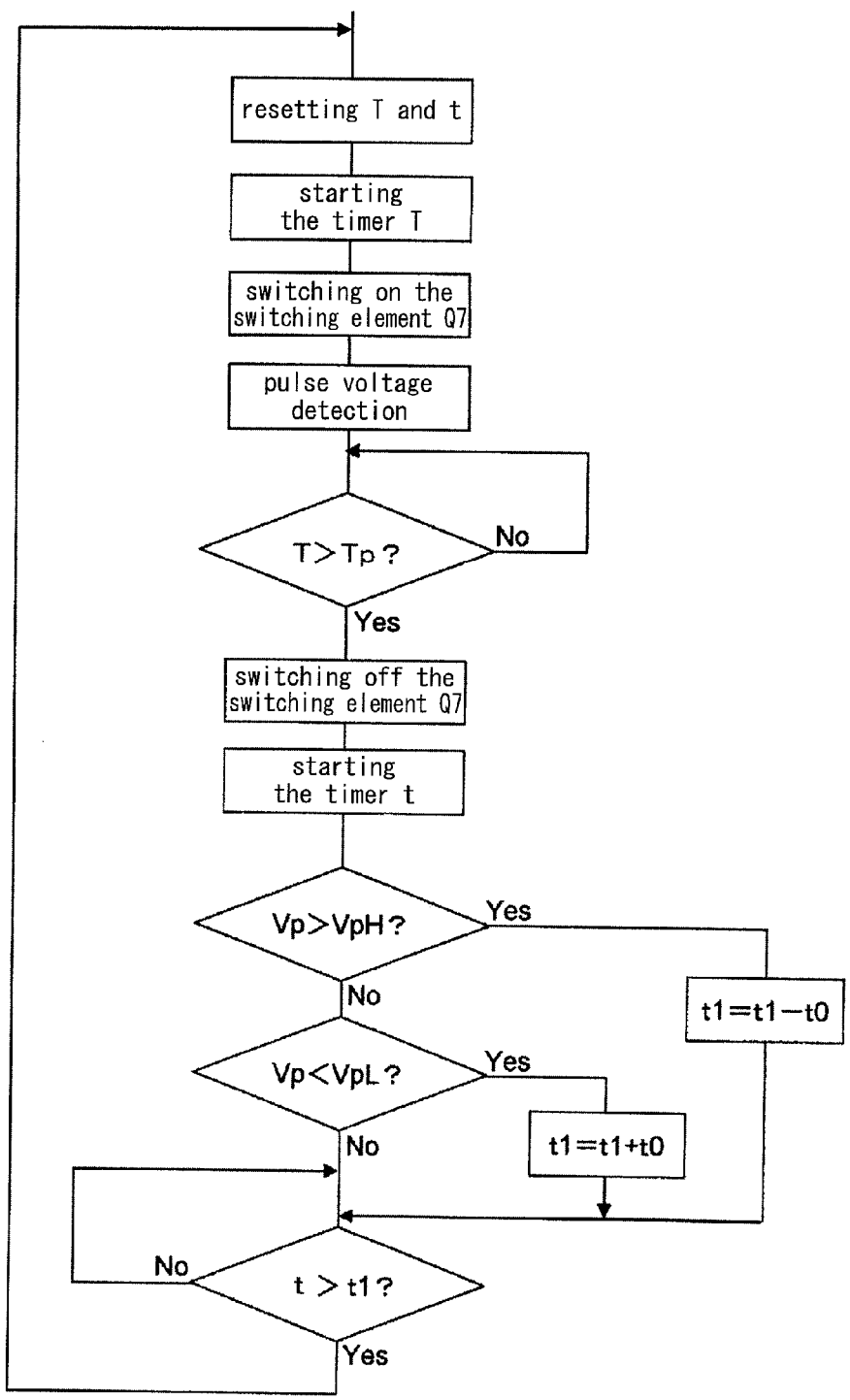
FIG. 15 shows a flow chart indicating the operation of the fifth embodiment.

FIG. 15 is a flow chart which shows the operation of the high pressure discharge lamp lighting device. In this embodiment, the microcomputer comprises a timer Ta and a timer Tb. The timer Ta is configured to measure the period T from when the switching element Q7 is turned on to when the switching element Q7 is turned off. The timer Tb is configured to measure the period t from when the capacitor C1 is started to be charged to when the switching element is turned on. When the period T is greater than a predetermined period Tp, the capacitor voltage varying means 20 is configured to output the signal to the controller in order to allow the controller to turn off the switching element Q7. In contrast, when the period t is greater than a predetermined period t1, the capacitor voltage varying means 20 is configured to output the signal to the controller in order to allow the controller to turn on the switching element Q7.

First, the timer Ta and the timer Tb are both reset, whereby the period T is equal to 0, and the period t is also equal to 0. Subsequently, the timer Ta starts measuring the time passage. The controller turns on the switching element Q7, whereby the starting pulse voltage is generated. The pulse voltage detection circuit detects the voltage value Vp of the starting pulse voltage. Then, the timer Ta judges whether the predetermined period Tp is passed or not. That is, the timer Ta waits to pass the predetermined period Tp. When the predetermined period Tp is passed, the controller turns off the switching element Q7. Then, the timer Tb starts to measure time passage. When the switching element Q7 is turned off, the capacitor C1 is started to be charged. Therefore, the timer Tb is equivalent to the timer circuit 24 which measures the time passage from when the capacitor C1 is started to be charged.

Next, the pulse voltage detection circuit compares the starting pulse voltage Vp with an upper limit value VpH and a lower limit value VpL. The upper limit value VpH and the lower limit value VpL defines an upper limit and a lower limit of the range for the starting pulse voltage Vp, respectively. When the starting pulse voltage Vp is higher than the upper limit voltage VpH, a new charging period t1 is determined by a predetermined value t0 which is subtracted from the prescribed charging period t1. In contrast, when the starting pulse voltage is lower than the lower limit value VpL, the new charging period t1 which is determined by the prescribed charging period t1 add to the predetermined value t0. Subsequently, the timer Tb turns on the switching element Q7, when the charging period t1 is passed. As a result, the igniter applies the starting pulse voltage to the high pressure discharge lamp. The starting pulse voltage regulation circuit repeats the above operation.

With this configuration, when the pulse voltage Vp is higher than the upper limit value VpH, the charging period t1 of the capacitor C1 until the switching element is turned on is shortened. As a result, the switching element Q7 is turned on in a condition where the capacitor C1 holds the low amount of charge, whereby the starting pulse voltage Vp is decreased. In contrast, when the starting pulse voltage Vp is lower than the lower limit value VpL, the charging period t1 for the capacitor C1 until the switching element Q7 is turned on is extended. As a result, the switching element Q7 is turned on in a condition where the capacitor C1 holds the large amount of charge. Therefore, the starting pulse voltage Vp is increased.

Further, it is preferred that the high pressure discharge lamp lighting device comprises the starting pulse voltage regulation circuit 15 being configured to vary "the voltage value of the direct current voltage which is output from the step-down chopper 4" on the basis of the detection signal of the pulse voltage detection circuit.

(Sixth Embodiment)

In this embodiment, the starting pulse voltage regulation circuit 15 is configured to regulate the output voltage which is output from the step down chopper 4. The circuit components are able to be realized by the components in the first to fourth embodiments.

Figure 16A:
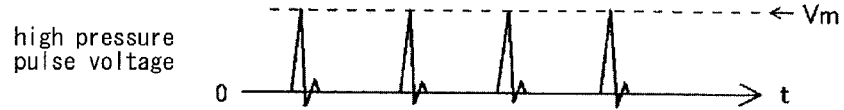
FIG. 16a to FIG. 16c show operation waveforms of the sixth embodiment in a case where the output line length is minimized.
Figure 16B:
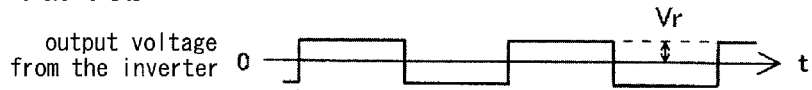
Figure 16C:
Figure 17A:
FIG. 17a to FIG. 17d show an operation waveform of the sixth embodiment in a case where the output line length is middle.
Figure 17B:
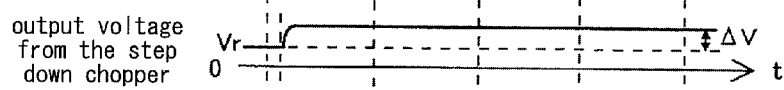
Figure 17C:
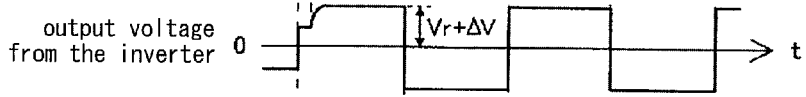
Figure 17D:
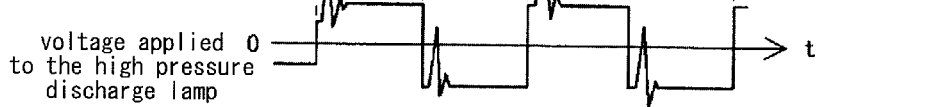
Figure 18A:
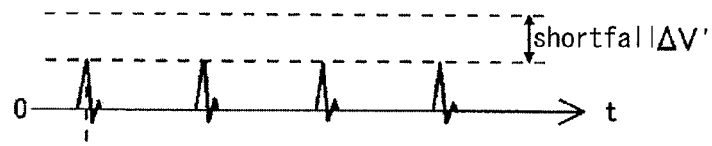
FIG. 18a to FIG. 18g show an operation waveform of the sixth embodiment in a case where the output line length is maximized.
Figure 18B:
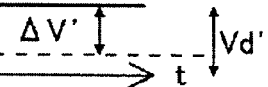
Figure 18C:
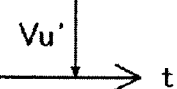
Figure 18D:
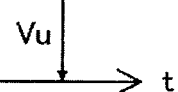
Figure 18E:
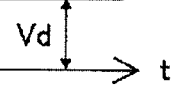
Figure 18F:
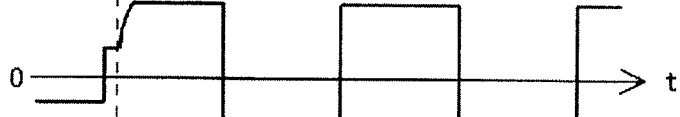
Figure 18G:
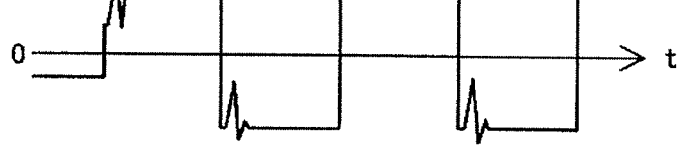

FIG. 16 shows the waveforms in a condition where the wire length to the high pressure discharge lamp 8 is short, and also where a floating capacitance of the wiring is extremely small. A maximum value of the pulse voltage of the transformer T1 which is stepped up is determined as the target value Vm of the pulse voltage. The output voltage value which is output from the step down chopper 4 is determined as the target output value Vr of the step down chopper 3 in a normal condition.

FIG. 17 shows the waveforms in a condition where the wire length to the high pressure discharge lamp 8 is long, and also where the pulse voltage which is stepped up by the transformer is caused to be attenuated due to the floating capacitance of the wiring. The pulse voltage of the transformer T1 which is stepped up is detected by the means which is mentioned in the first to fourth embodiment. The detected pulse voltage of the transformer T1 is divided by the voltage dividing circuit 11, whereby the pulse voltage detection circuit 12 detects the pulse voltage component. The pulse voltage component is fed back to the step down chopper 4. The step down chopper 4 increases the output target value to a predetermined value which is δV greater than the target value Vr in the normal condition. The δV corresponds to the difference between the output target value Vm and the pulse voltage Vp. (The δV is, in other words, a shortfall from the target value).

FIG. 18 shows the waveforms in a case where "the voltage value of the output target value Vd of the step down chopper 4" is higher than the input voltage of the step down chopper 4. Under the condition, the step down chopper 4 sends the output target value Vd to the step up chopper 3. The step up chopper 3 determines the output target value Vu which is greater than the output target value Vd of the step down chopper. In this manner, the step up chopper 3 is regulated in such a manner that the step up chopper 3 increases the voltage value of the output voltage. Accordingly, the input voltage which is input to the step down chopper 4 is increased. Therefore, it is possible to heighten the output of the step down chopper 4.

In this manner, a shortfall of the pulse voltage which is stepped up by the transformer T is offset by the output voltage which is output from the step down chopper 4. Therefore, it is possible to keep the peak value of the voltage applied to the high pressure discharge lamp 8 always constantly. Therefore, it is possible to employ as the starting pulse voltage regulation circuit 15.

In addition, it is preferred for the high pressure discharge lamp lighting device to employ the starting pulse regulation circuit being configured to vary the direct current voltage which is output from the step down chopper uniformly.

(Seventh Embodiment)

In this embodiment, the step down chopper 4 is configured to output the output voltage during the start process of the high pressure discharge lamp lighting device, and to vary the output voltage uniformly. When the output voltage which is output from the step down chopper 4 reaches a predetermined value, the switching element Q7 of the igniter 7 is turned on. In this embodiment, it is possible to employ the circuit components disclosed in the first to fourth embodiment.

FIG. 19 shows the waveforms in the each components.

When there is no load, as shown in FIG. 19, the step down chopper 4 is controlled to output the output voltage which is varied uniformly. Abscissas axes indicate the time axes. The ordinate axis indicate the voltage value. The waveform of the voltage which is converted into the low frequency alternating current output from the output voltage of the step down chopper 4 by the inverter 6 is shown. A cycle of the low frequency alternating current is, generally, several hundred Hz. An amplitude is, generally, several hundred V.

The pulse voltage which is stepped up by the transformer T1 is detected by the means of at least one of the first to fourth embodiments. The detected pulse voltage is divided by the voltage dividing circuit 11, whereby the pulse voltage detection circuit 12 detects the pulse voltage component. The pulse voltage component is fed back to the control circuit. The control circuit calculates "the differences δV of the pulse voltage from a feedback signal of the pulse voltage" as a output variation value. When the output variation value δV becomes equal to the output variation value of the output which is output from the step down chopper 4, the control circuit turns on the switching element Q7. Therefore, the pulse voltage is generated. Consequently, it is possible to offset the difference of the pulse voltage by the variation of the output voltage which is output from the inverter 6. Therefore, it is possible to keep the peak voltage applied to the high pressure discharge lamp at a moment when the high pressure discharge lamp lighting device is started.

In addition, in this embodiment, as shown in FIG. 20, the step down chopper 4 is configured to output the output voltage, and to vary the output voltage in such a manner that the output voltage is varied continuously from when the polar is inverted. However, the variation of the output voltage is not limited thereto. For example, it is possible to employ the step up chopper 4 being configured to output the output voltage which has a step-like shaped waveform. In a case where the step down chopper 4 outputs the output voltage which has a step-like shape, the switching element Q7 is turned on at a moment when the difference between the "output value which is output from the pulse voltage detection circuit 12" and "the output value which is output from the step down chopper detection circuit becomes smallest. The output value which is output from the step down chopper detection circuit is an elevated level of the output which is output from the step down chopper. When the output voltage which is output from the step down chopper 4 has the waveform of step-like shape shown in FIG. 21, it is not possible to regulate the peak value of the voltage applied to the high pressure discharge lamp 8 continuously. However, it is possible to easily regulate the peak value of the voltage applied to the high pressure discharge lamp 8 to a value to a target value even if there is a delay of the signal in the control circuit.

Furthermore, it is possible for the high pressure discharge lamp lighting device to employ the starting pulse voltage regulation circuit being configured to vary the starting pulse voltage only in the half cycle of the waveform which is output from the inverter.

(Eighth Embodiment)

In this embodiment, the output target value of the output which is output from the step down chopper 4 is set according to the variation amount of the high pressure pulse voltage at only a half cycle of the rectangular wave output having a polar equal to that of the high pressure pulse voltage. In addition, the high pressure pulse voltage is applied only at a half cycle of the rectangular waveform output having a polar equal to the high pressure pulse voltage. For example, when the high pressure pulse voltage has a polarity which is equal to a positive polarity of the rectangular output voltage, the switching element Q7 is turned on when the polarity is inverted from the negative polarity into the positive polarity. It should be noted that the circuit components in the first to fourth embodiment may be employed to this embodiment.

FIG. 22 shows the waveforms of the each component. As will be understood from FIG. 22, the combinations of the high pressure pulse voltage and the polarity of the rectangular waveform include undesirable combinations which is not capable of effectively regulating the output of the step down chopper 4. Therefore, the step down chopper is regulated to output the output voltage which is regulated only when the high pressure pulse voltage has a polarity which is equal to the polarity of the rectangular wave output in the half cycle. Consequently, it is possible to widen the regulation range of the peak voltage applied to the high pressure discharge lamp compared with the case where an effective value of the output voltage is stable. Therefore, it is possible to prevent the generation of the high pressure pulse voltage for needless to turn on the high pressure discharge lamp.

In addition, it is possible for the high pressure discharge lamp which comprises a starting pulse voltage regulation circuit being configured to increase the lighting voltage only at a certain period of the half cycle of the lighting voltage which is output from the inverter.

(Ninth Embodiment)

In this embodiment, as shown in FIG. 23, the output target value of the step down chopper is set according to the variation amount of the high pressure pulse voltage at a certain period of the half cycle of the rectangular wave output having a polarity which is equal to the polarity of the high pressure pulse voltage. Consequently, the output of the step down chopper 4 is regulated. For example, when "the rectangular wave output has a positive polarity" and "the regulation of the output from the step down chopper 4 is effective", the starting pulse voltage generation circuit controlling circuit turns on the switching element Q7 at a moment when the polarity of the rectangular wave output is inverted from the negative to the positive. In this embodiment, it is possible to employ the circuit components which are disclosed in the circuit components of the first to fourth embodiment.

When the polarity of the voltage of the rectangular wave output is inverted from the negative polarity into the positive polarity, the step down chopper 4 sets the output target value according to the variation amount of the high pressure pulse voltage. That is, the output target value of the step down chopper 4 is temporarily increased to offset the shortfall $\delta Vp$ of the high pressure pulse voltage. Then, when the switching element Q7 is turned off, the output target value of the step down chopper 4 is decreased.

In this manner, the output of the step down chopper 4 is regulated only when the high pressure pulse voltage is developed. Consequently, it is possible to decrease the effective value of the voltage applied to the high pressure discharge lamp 8 considerably. Therefore, it is possible to widen the regulation range of the peak value of the pulse voltage applied to the high pressure discharge lamp. Furthermore, it is also possible to prevent the development of the high pressure pulse voltage which is needless for turning on the high pressure discharge lamp.

(Tenth Embodiment)

Figure 24:
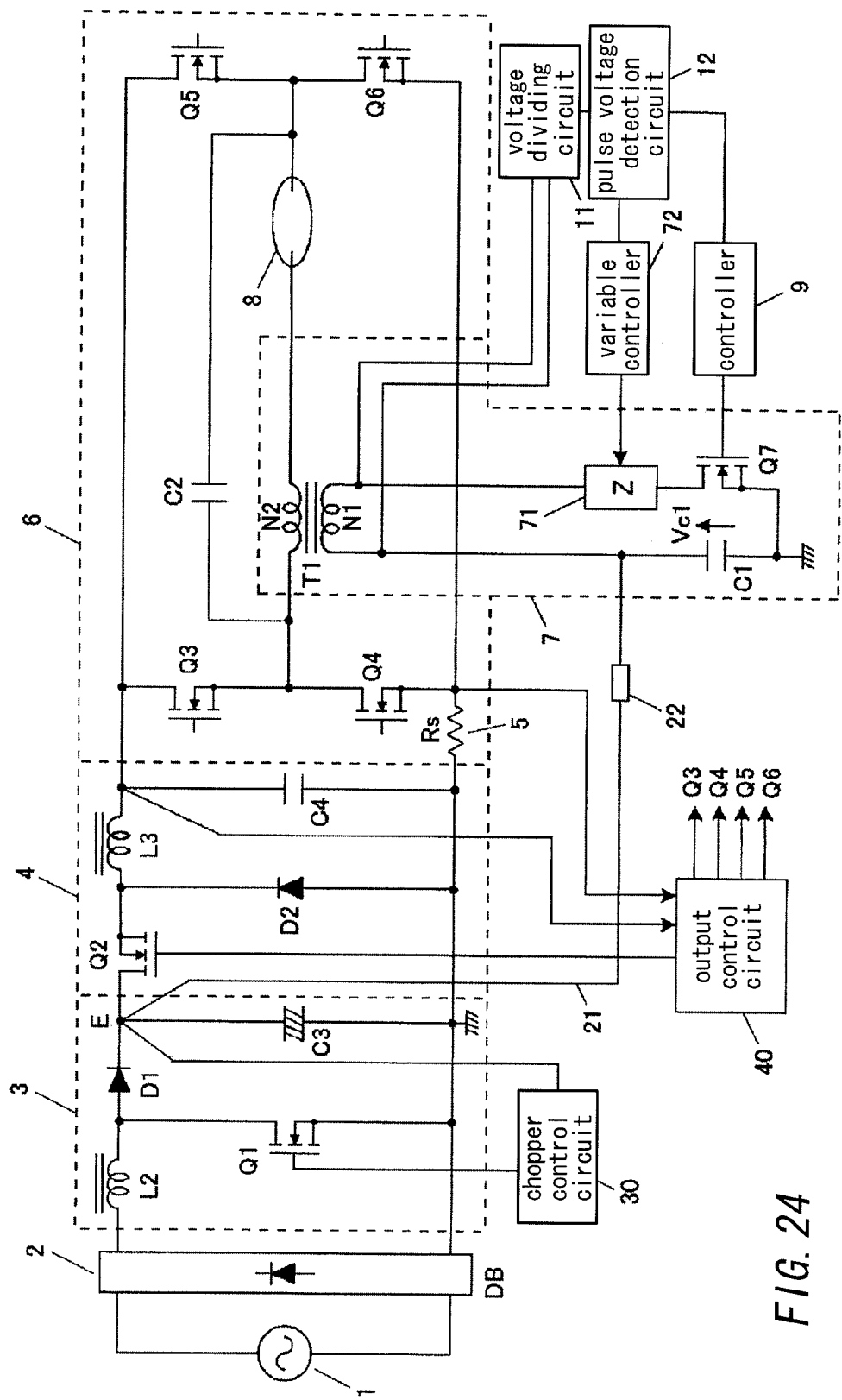
FIG. 24 shows a circuit diagram indicative of the all components in the tenth embodiment.

FIG. 24 is a circuit diagram showing entire configurations in the tenth embodiment. The starting pulse voltage regulation circuit in this embodiment detects the peak value of the high pressure pulse voltage according to the voltage developed in the primary winding N1 of the transformer T1. The peak value detected by the starting pulse voltage regulation circuit is stepped down by the high pressure pulse voltage to produce the stepped down peak value. The stepped down peak value is fed back to the pulse voltage detection circuit 12. The pulse voltage detection circuit 12 calculates a correction value of a pulse voltage which is generated in the next time. The impedance variation control circuit 72 is configured to variably control the impedance component Z of the variable impedance 71.

The pulse voltage detection circuit 12 may be, for example, realized by the microcomputer. In this case, the microcomputer comprises a table for determining the correction value of the impedance component Z according to the value of the high pressure pulse voltage which is fed back from the primary winding N1.

Figure 25:
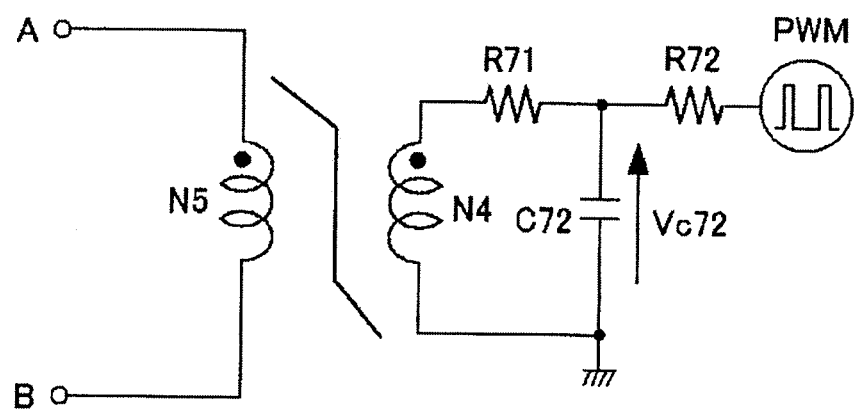
FIG. 25 shows a circuit diagram indicating the main components in the tenth embodiment.

The variable impedance element 71 is, for example, realized by a saturable inductance element (saturable reactor) shown in FIG. 25. The Impedance regulation control circuit 72 is configured to produce a PWM signal which is controlled by a ratio of the duty cycle according to the correction value. The variable impedance element 71 is configured to generate a bias voltage Vc7 by an integration resistor R72 in combination with an integration capacitor 72. A current which corresponds to a level of the bias voltage Vc72 flows from the integration capacitor C72 through the bias resistor R71 to the control winding N4. Consequently, a level of "current which saturates the main winding N5 when the switching element Q7" is switched on is realized.

After the value of the impedance component Z is corrected, the controller 9 turns on the switching element Q7. Consequently, the closed circuit composed of the primary winding of the transformer is constructed. As a result, the electrical charge which is charged in the capacitor C1 is discharged, thereby developing the pulse voltage to the primary winding N1. As the pulse voltage is developed in the primary winding N1, the high pressure pulse voltage (which has a voltage value between the 3 kV to 5 kV) is developed in the secondary winding N2. The high pressure pulse voltage is turn ratio (N2/N1) times of the pulse voltage in the primary winding N1.

It is assumed that the charging voltage Vc1 which is charged in the capacitor C1 has approximately constant voltage value when the switching element Q7 of the circuit which is composed of the primary winding N1 of the transformer.

For example, it is assumed that the capacitor C1 is electrically charged to have "a voltage value which is equivalent to the voltage value Vc3 which is held by the capacitor C3 at a predetermined timing" through "an element 22 which is exemplified by the resistor and the switching element" from the direct current power source 21. This is also applied to the embodiments which are explained hereinafter.

According to the embodiments, it is possible to obtain the high pressure discharge lamp lighting device which is realized by the simple circuit and which is configured to output the high pressure pulse voltage having a constant peak value which is required for starting the high pressure discharge lamp in a case where the output line is extended.

(Eleventh Embodiment)

Figure 26:
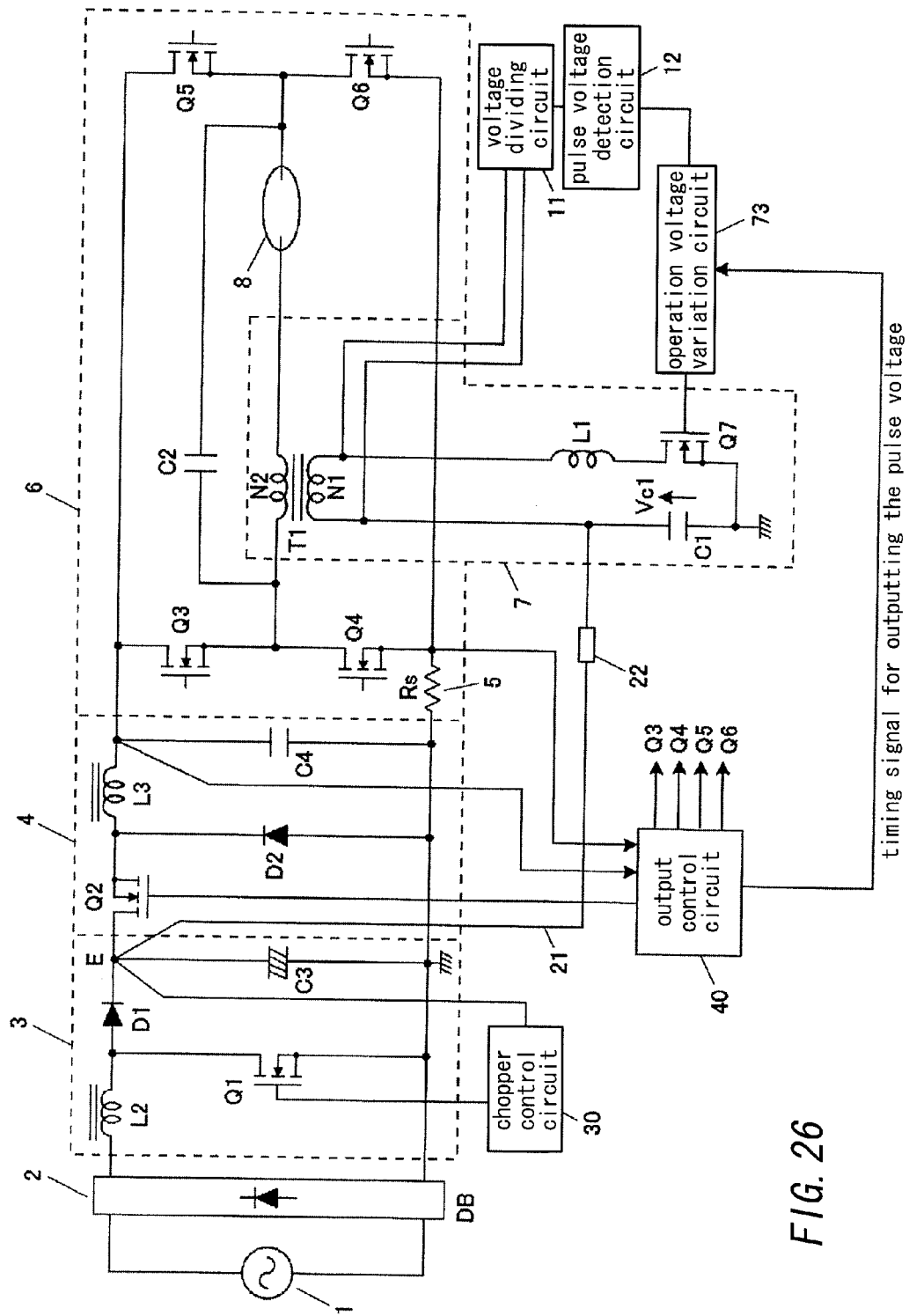
FIG. 26 shows a circuit diagram indicating the all components in the eleventh embodiment.

FIG. 26 shows a circuit diagram of the eleventh embodiment. In this embodiment, an inductor L1 is employed instead of the variable impedance element 71 of the above embodiment. The inductor L1 is provided for avoiding an excess current from flowing. In addition, this embodiment also employs an operation voltage variation circuit 73 instead of the impedance variation control circuit 72. The operation voltage variation circuit 73 is configured to vary "an on-resistance having a resistance value when the switching element Q7 is turned on" according to the correction value of the pulse voltage. Consequently, the impedance of the primary winding circuit of the transformer is varied.

The peak value of the high pressure pulse voltage is detected by the primary winding N1 of the transformer T1. The voltage dividing circuit 11 reduces the level of the detected voltage which is detected by the primary winding N1, and feed back the reduced detected voltage to the pulse voltage detection circuit 12. The pulse voltage detection circuit 12 calculates the correction value of the pulse voltage which is generated next time. The operation voltage variation circuit 73 varies the voltage level for operation of the switching element Q7 according to the correction value.

When the output control circuit 40 receives "a pulse output timing signal", the operation voltage variation circuit 73 turns on the switching element Q7 at "an operation voltage level which is determined by the operation voltage variation circuit 73".

It is possible to feed back an accurate level of the peak value without disturbance noise which is caused by the hydraulic transient of the rectangular wave voltage by turning on the switching element Q7 which is turned on at a timing being little delayed from a moment when the polarity is inverted. In addition, "the operation voltage variation circuit 73 turns on the switching element Q7 at timing several hundred microsecond to several micro-second before the polarity inversion of next time" such that "it is possible to supply electrical power which is required for stabilize a discharge condition when the pulse voltage breaks down an insulation of the high pressure discharge lamp". This configuration is also applied to the embodiments other than the present embodiment.

Figure 27:
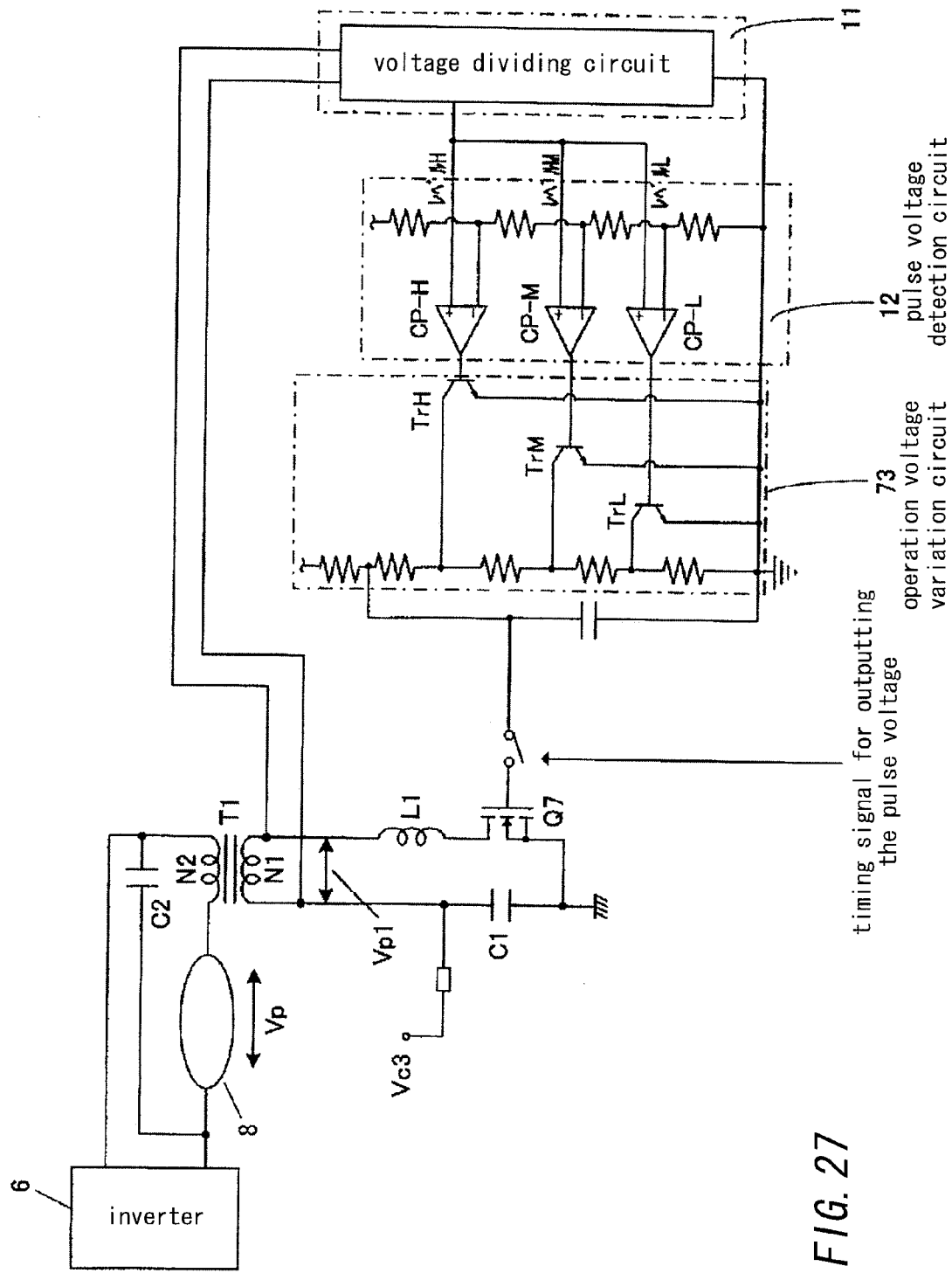
FIG. 27 shows a circuit diagram indicating the main components in the eleventh embodiment.

FIG. 27 shows a main component of the embodiment. The primary winding N1 detects the pulse voltage. The detected pulse voltage is divided by the voltage dividing circuit 11. the divided pulse voltage is fed back to the pulse voltage detection circuit 12. The pulse voltage detection circuit 12 comprises a comparator CP-H, a comparator CP-M, and a comparator CP-L. In this embodiment, the comparator CP-H has a reference level H. The comparator CP-M has a reference level M. The comparator CP-L has a reference level L. The pulse voltage detection circuit 12 outputs a comparative result which is produced by the comparators CP-H, CP-M, and CP-L. The operation voltage variation circuit 73 corrects the voltage level for operating the switching element Q7 on the basis of the comparative result.

Figure 28:
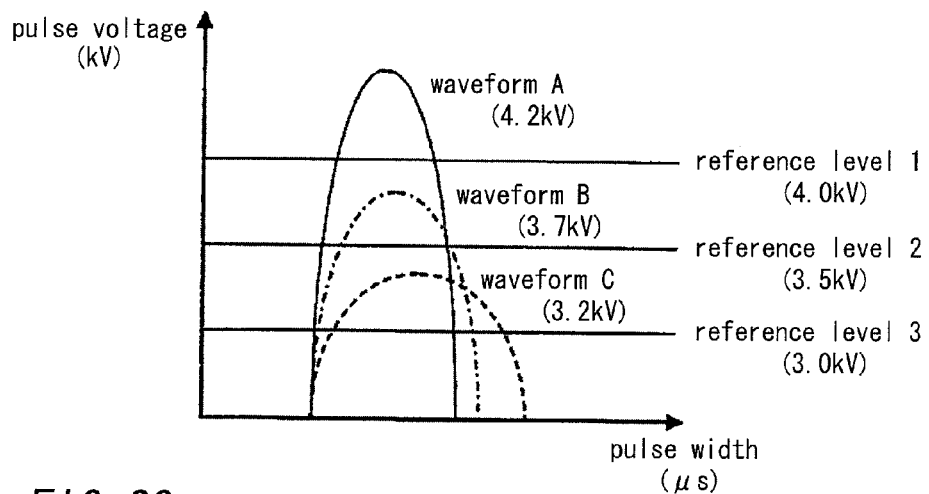
FIG. 28 shows a waveform indicating the starting pulse waveform in the eleventh embodiment.

FIG. 28 shows a relationship between the pulse voltage and each reference levels. "The number of the reference level" and "setting values" are arbitrarily determined. It goes without saying that the correction is segmentalized by segmentalizing the reference levels. The value corrected therein is held by the control circuit. The control circuit is configured to use the corrected value next time of generating the starting pulse voltage.

Figure 29:
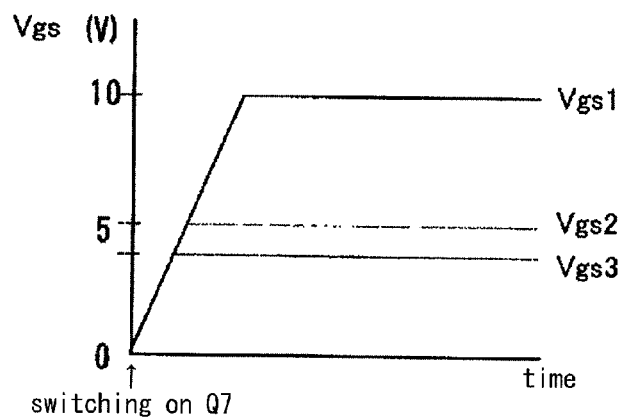
FIG. 29 shows a characteristic diagram for explaining the operation of the eleventh embodiment.

For example, in a case where the pulse voltage is low, the comparator CP-L (having the level L) is only turned on. Therefore, the operation voltage level for the switching element Q7 is increased. In addition, when the pulse voltage is high, the comparator CP-H (having the level H) is also turned on. Therefore, the operation voltage level for operating the switching element Q7 is decreased. As a result, the operation voltage level of the switching element Q7 is regulated among the three steps shown in Vgs1, Bgs2, and Vgs3 in FIG. 29.

Figure 30:
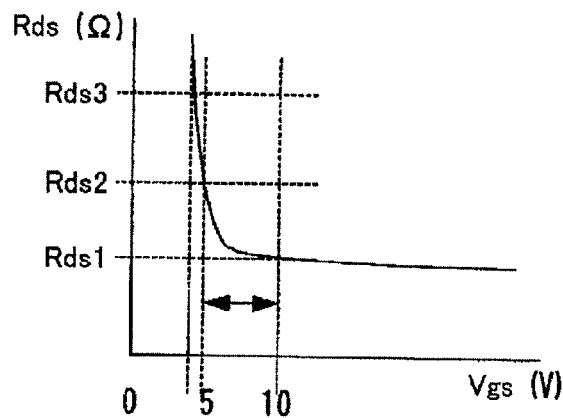
FIG. 30 shows a characteristic diagram for explaining the operation of the eleventh embodiment.
Figure 31:
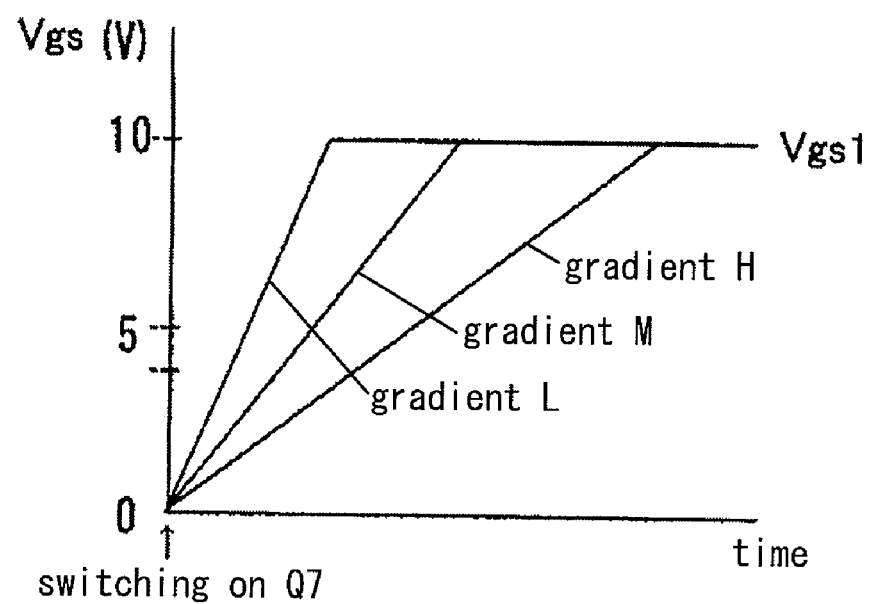
FIG. 31 shows a characteristic diagram for explaining the operation of the eleventh embodiment.

If the operation voltage level of the switching element Q7 is varied, the on-resistance Rds between the drain and source is varied with respect to the voltage Vgs between the gate and the source of FET, as shown in FIG. 30. Therefore, the impedance value of the circuit which is composed of the primary winding N1 of the transformer at a moment when the switching element Q7 is switched on is varied regulated.

Needless to say, it is also possible to vary the impedance value of the circuit which is composed of the primary winding N1 of the transformer at a moment when the switching element Q7 is switched on by varying the gradient of the voltage (the voltage variation according to time passage), as shown in FIG. 30.

When the operation voltage variation circuit receives the on-signal which is sent from the controller 9, the operation voltage variation circuit turns on the switching element Q7. When the operation voltage variation circuit turns on the switching element Q7, the closed circuit composed of a primary winding of the transformer is constructed. Consequently, the capacitor C1 discharges the electrical charge, thereby generating the pulse voltage in the primary winding N1. According to the generation of the pulse voltage, the high pressure pulse voltage is developed. The high pressure pulse voltage is equivalent to a boosted voltage of the primary winding N1 at a rate corresponding to the turn ratio of the secondary winding N2 with respect to the primary winding N1. Specifically, the high pressure pulse voltage has a voltage value within 3 to 5 kV.

With this configuration, it is possible to obtain the high pressure discharge lamp lighting device which is simple and at low cost, and which is configured to output the high pressure pulse voltage having a constant peak value which is required for starting the high pressure discharge lamp in a case where the output line is lengthened.

(Twelfth Embodiment)

Figure 32:
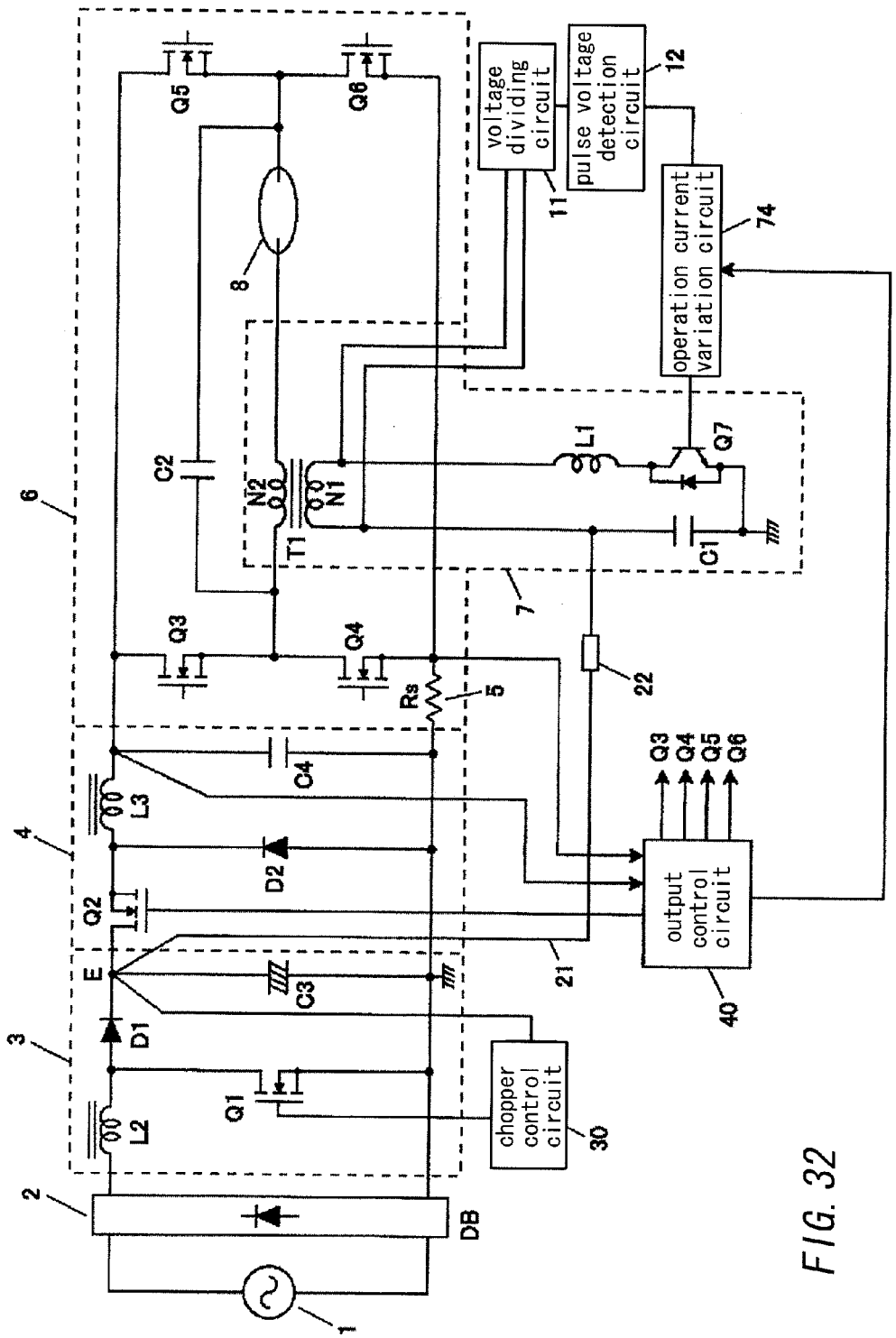
FIG. 32 shows a circuit diagram indicating the all components of the twelfth embodiment.

FIG. 32 shows a circuit diagram of the twelfth embodiment. In this embodiment, the switching element Q7 is realized by the bipolar transistor instead of the MOSFET. In addition, the operation current variation circuit 74 is employed instead of the operation voltage variation circuit 73. In addition, the diode is connected between the corrector and the emitter of the bipolar transistor in such a manner that the diode passes the current from the emitter to the corrector. The diode is provided for passing the regenerative current.

The operation voltage variation circuit 73 in the eleventh embodiment is configured to vary the amplitude or the gradient of the operation voltage of the MOSFET according to the correction value of the pulse voltage. However, this embodiment is different from the eleventh embodiment in the operation current variation circuit 74. The operation current variation circuit 74 is configured to vary amplitude or a gradient of the operation current (base current) of the bipolar transistor according to the correction value of the pulse voltage.

Figure 33:
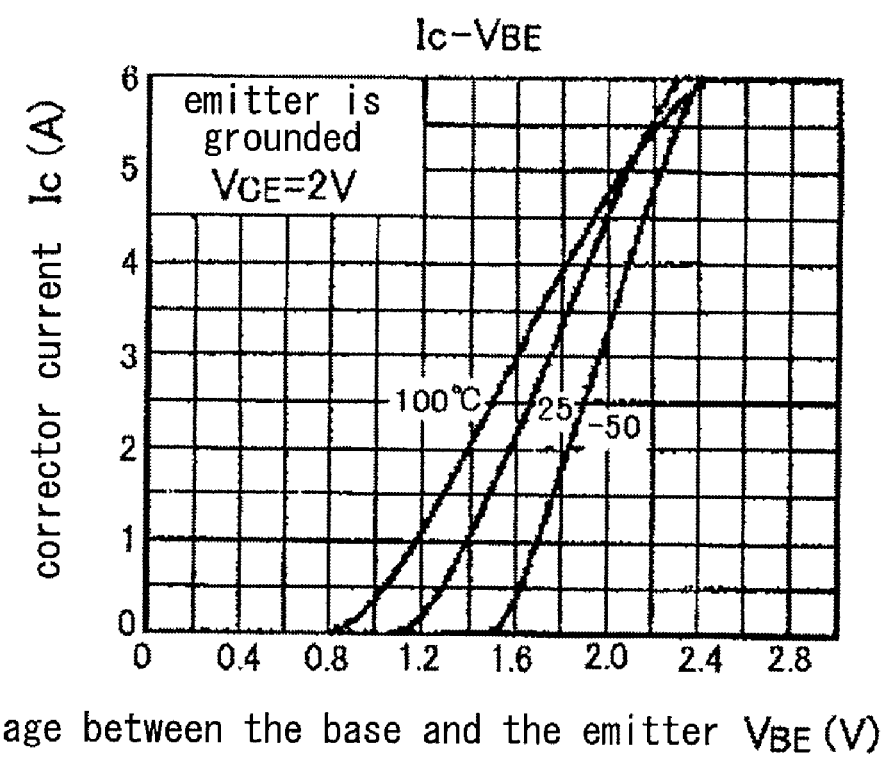
FIG. 33 shows a characteristic diagram for explaining the operation of the twelfth embodiment.

FIG. 33 shows a relationship between "the voltage Vbe between the base and the emitter" and "the corrector current Ic". As is obvious from the relationship, it is possible to regulate the corrector current Ic by regulating the voltage Bbe between the base and the emitter according to the correction value of the pulse voltage. Consequently, it is possible to regulate the impedance component of the circuit composed of the primary winding when the switching element Q7 is turned on. The components other than the operation current variation circuit is realized by the components of above mentioned.

(Thirteenth Embodiment)

Figure 34:
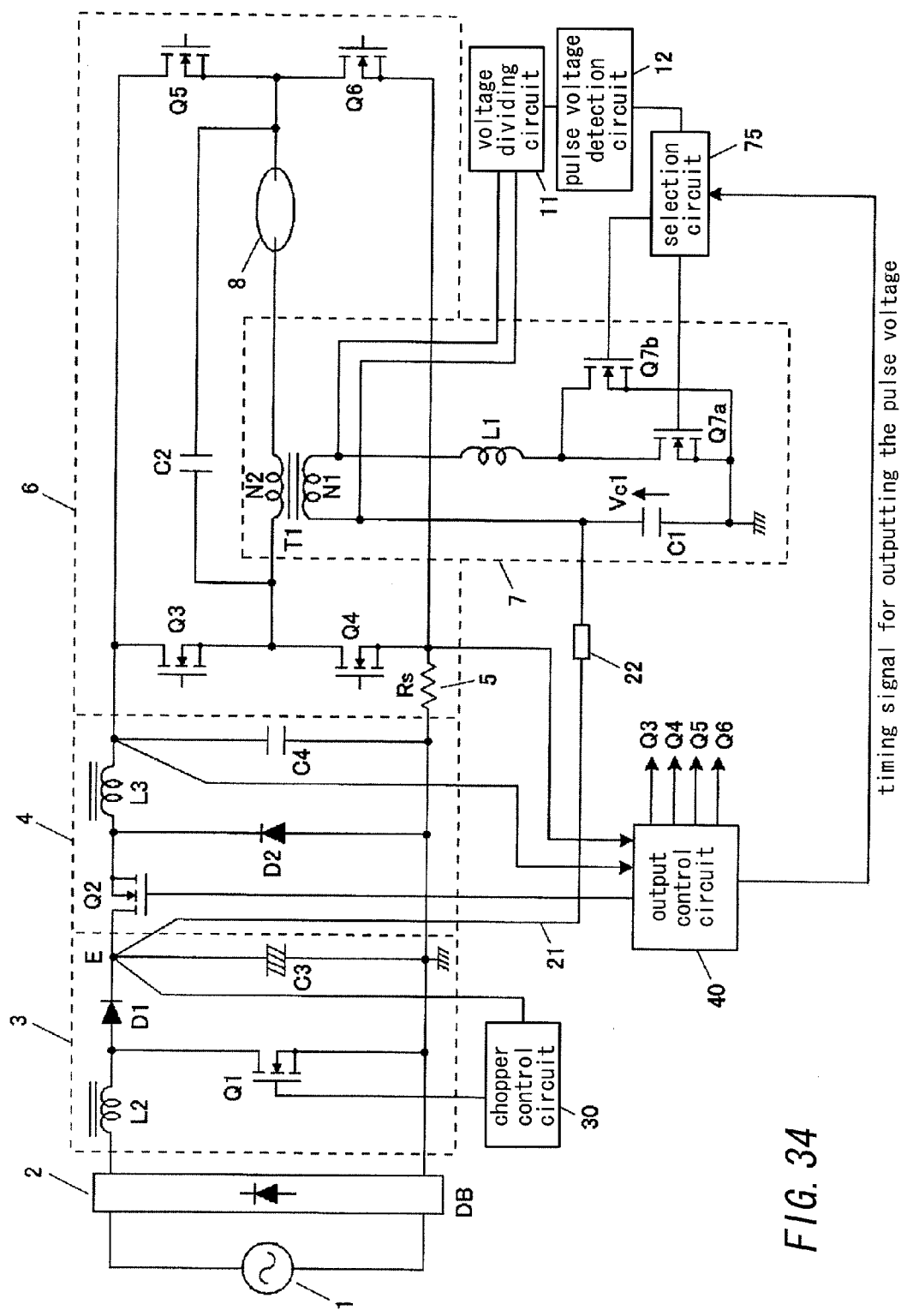
FIG. 34 shows a circuit diagram indicating the all components in the thirteenth embodiment.

FIG. 34 shows a circuit diagram of the thirteenth embodiment. This embodiment is different from the eleventh embodiment in following two features. First feature of the two features is a parallel circuit which comprises a switching element Q7a and a switching element Q7b which is connected in parallel with the switching element Q7a. The switching element Q7a has an on-resistance which is different from an on-resistance of the switching element Q7b. Second feature of the two features is a selection circuit 75. The selection circuit 75 is configured to turn on either one of the switching element Q7a or the switching element Q7b. Consequently, the selection circuit 75 regulates the impedance components of the circuit composed of the primary winding.

The difference of the on-resistance between the switching element Q7a and the switching element Q7b is selected by the corrective accuracy. Furthermore, it is possible to employ additional switching element as necessary. In addition, it is also possible to employ the control of the variation of the gate voltage as mentioned in the eleventh embodiment.

In addition, it is also possible to employ the switching element Q7a in series with a first resistor, and the switching element Q7b which is in series with a second resistor which has a resistance different from a resistance of the first resistor. With this configuration, it is also possible to regulate the impedance of the circuit of the primary winding of the transformer when the switching element Q7a or the switching element Q7b is turned on. It should be noted that the components other than the above is same as the eleventh embodiment.

(Fourteenth Embodiment)

Figure 35A:
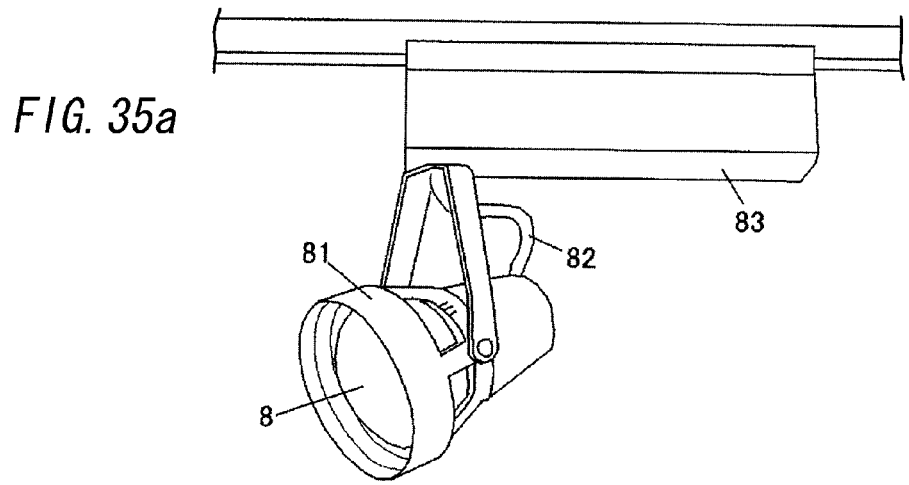
FIG. 35a to FIG. 35c show perspective views of the lighting fixtures in the fourteenth embodiment.
Figure 35B:
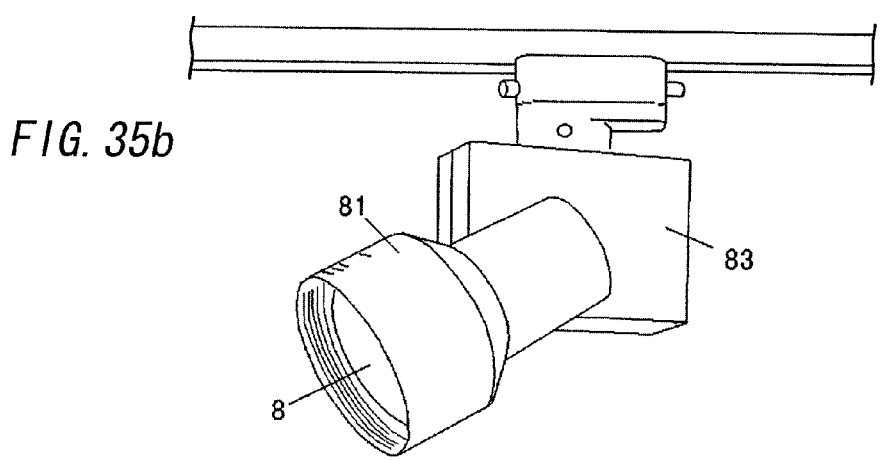
Figure 35C:
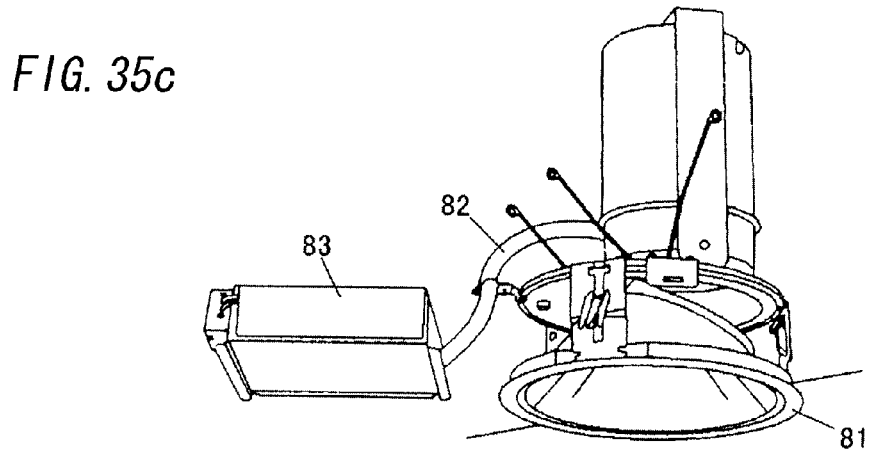

FIG. 35 shows a lighting fixture with the high pressure discharge lamp lighting device. FIG. 35 (*a*) and FIG. 35 (*b*) show spotlights which incorporates the HID lamp. FIG. 35 shows a downlight which incorporates the HID lamp. FIG. 35 (*a*) to FIG. 35 (*c*) comprises a housing 81, a wiring 82, and a ballast 83. The housing 81 is provided for holding the high pressure discharge lamp. The ballast 83 incorporates the circuit of the lighting device. It is possible to construct the lighting system by combining a plurality of the lighting fixtures. The lighting fixture with the high pressure discharge lamp lighting device of the above embodiments is capable of regulating the peak value at a suitable level even if the wiring 82 is long. In addition, the lighting fixture with the high pressure discharge lamp lighting device of the above embodiments is also capable of reducing the peak value of the starting pulse voltage in a case where the wiring 82 is short.

The high pressure discharge lamp lighting device being configured to output the starting pulse voltage which is free from the attenuation even if the wiring length is increased is capable of wiring the wire 82 from, for example, 2 meters to 10 meters. Therefore, it is possible to enhance the construction possibility. In addition, it is also possible to dispose a plurality of the ballast 83 in the same location. Further, it is possible to reduce the distance of the wiring. As a result, the maintenance personnel is able to check the ballasts at once.

The invention claimed is

1. A high pressure discharge lamp lighting device comprising,
   an inverter having an output terminal and being configured to apply a lighting voltage to a high pressure discharge lamp through said output terminal,
   an igniter comprising a capacitor, a switching element, and a transformer, said capacitor being configured to be charged by a voltage source, said transformer comprising a primary winding and a secondary winding, said primary winding being connected across said capacitor in series with said switching element, said secondary winding being connected in series with the high pressure discharge lamp, and being connected across said inverter,
   a controller being configured to turn on and turn off said switching element, said controller being configured to turn on said switching element in order to allow the capacitor to discharge for applying a discharging current to the primary winding, whereby the controller is configured to apply the starting pulse voltage which is generated in said secondary winding and which is generated by the discharge current which flows through the primary winding to the high pressure discharge lamp,
   a pulse voltage detection circuit being configured to detect a voltage indicative of the starting pulse voltage applied to said high pressure discharge lamp, and generate a detection signal corresponding to said starting pulse voltage,
   a starting pulse voltage regulation circuit being configured to regulate the starting pulse voltage to a predetermined value according to the detection signal,
   wherein
   said pulse voltage detection circuit being configured to detect the starting pulse voltage or a pulse voltage which is caused across a specific circuit component of said igniter as the voltage indicative of the starting pulse voltage applied to said high pressure discharge lamp.

2. The high pressure discharge lamp lighting device as set forth in claim 1, wherein
   said pulse voltage detection circuit is connected across the high pressure discharge lamp, whereby said pulse voltage detection circuit is configured to detect said starting pulse voltage and to output the detection signal corresponding to the starting pulse voltage.

3. The high pressure discharge lamp lighting device as set forth in claim 1, wherein
   said pulse voltage detection circuit being connected in parallel with said primary winding, and
   said pulse voltage detection circuit being configured to detect the pulse voltage caused across said primary winding, and generate the detection signal corresponding to said pulse voltage.

4. The high pressure discharge lamp lighting device as set forth in claim 1, wherein
   said igniter further comprises an impedance connected in series with said primary winding,
   said pulse voltage detection circuit being configured to detect the pulse voltage developed across said impedance and generate the detection signal corresponding to the pulse voltage.

5. The high pressure discharge lamp lighting device as set forth in claim 1, wherein
said pulse voltage detection circuit being configured to detect a peak value of the voltage indicative of the starting pulse voltage, and generate the detection signal corresponding to the peak value of the voltage indicative of the starting pulse voltage.

6. The high pressure discharge lamp lighting device as set forth in claim 1, wherein
said pulse voltage detection circuit is configured to detect a period from a first time when the voltage indicative of the starting voltage becomes equal to a first voltage value to a second time when the voltage indicative of the starting voltage becomes equal to the first voltage value, said second time is next to the first time, and
said pulse voltage detection circuit being configured to generate the detection signal corresponding to the period.

7. The high pressure discharge lamp lighting device as set forth in claim 1, wherein
said pulse voltage detection circuit is configured to detect a period from a first time when the voltage indicative of the starting voltage becomes equal to a first voltage value to a second time when the voltage indicative of the starting voltage becomes equal to a second voltage value, and
said pulse voltage detection circuit being configured to generate the detection signal on the basis of the period.

8. The high pressure discharge lamp lighting device as set forth in claim 1, wherein
said switching element being configured to be turned on when said switching element receives an operating voltage, and having an internal impedance which is varied according to a voltage value of the operating voltage,
said pulse voltage detection circuit being configured to generate the detection signal indicative of a voltage level corresponding to the voltage value of the voltage indicative of the starting pulse voltage,
said starting pulse voltage regulation circuit being configured to vary the operation voltage according to the detection signal.

9. A lighting fixture comprising the high pressure discharge lamp lighting device as set forth in claim 1.

* * * * *